US009142253B2

(12) United States Patent
Ubillos

(10) Patent No.: US 9,142,253 B2
(45) Date of Patent: Sep. 22, 2015

(54) ASSOCIATING KEYWORDS TO MEDIA

(75) Inventor: Randy Ubillos, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 1221 days.

(21) Appl. No.: 11/760,631

(22) Filed: Jun. 8, 2007

(65) Prior Publication Data
US 2008/0155459 A1 Jun. 26, 2008

Related U.S. Application Data

(60) Provisional application No. 60/871,740, filed on Dec. 22, 2006.

(51) Int. Cl.
G06F 3/00 (2006.01)
G11B 27/034 (2006.01)
G11B 27/34 (2006.01)
G06F 3/0484 (2013.01)
G06F 3/048 (2013.01)
G06F 3/0486 (2013.01)
G06F 3/0481 (2013.01)

(52) U.S. Cl.
CPC ............. G11B 27/034 (2013.01); G11B 27/34 (2013.01); G06F 3/048 (2013.01); G06F 3/0481 (2013.01); G06F 3/0484 (2013.01); G06F 3/0486 (2013.01)

(58) Field of Classification Search
CPC ......... G06F 3/01; G06F 3/048; G06F 3/0481; G06F 3/0484; G06F 3/0486
USPC ........................... 715/838, 719, 724, 777, 738
See application file for complete search history.

(56) References Cited

U.S. PATENT DOCUMENTS

| 5,101,364 | A | * | 3/1992 | Davenport et al. ........... 715/723 |
| 5,237,648 | A | | 8/1993 | Mills et al. |
| 5,359,712 | A | * | 10/1994 | Cohen et al. .................. 715/723 |
| 5,442,744 | A | * | 8/1995 | Piech et al. .................... 715/251 |
| 5,491,778 | A | * | 2/1996 | Gordon et al. ................ 345/640 |
| 5,513,306 | A | * | 4/1996 | Mills et al. .................... 715/202 |
| 5,535,063 | A | * | 7/1996 | Lamming ........................ 360/4 |
| 5,666,504 | A | | 9/1997 | Crutcher |
| 5,699,458 | A | | 12/1997 | Sprague |

(Continued)

FOREIGN PATENT DOCUMENTS

| CN | 1354417 | 6/2002 |
| EP | 0576030 | 12/1993 |

(Continued)

OTHER PUBLICATIONS

Sole, Jorge Garcia, Authorized Officer, European Patent Office, in PCT International Application No. PCT/US2007/085939, International Search Report and Written Opinion, mailed Jul. 31, 2008, 12 pages.

(Continued)

Primary Examiner — Steven B Theriault
(74) Attorney, Agent, or Firm — Fish & Richardson P.C.

(57) ABSTRACT

A computer-implemented method includes displaying, within a user interface in a digital media system, a media pane and a tools pane, displaying, within the media pane, a thumbnail group representing a media item, the thumbnail group including one or more thumbnails, displaying, within the tools pane, a tool configured to assign a keyword, enabling a user to select a segment of the media item, and enabling a user to assign a keyword to the selected segment by activating the tool.

60 Claims, 10 Drawing Sheets

(56) References Cited

U.S. PATENT DOCUMENTS

| | | | |
|---|---|---|---|
| 5,812,128 A | 9/1998 | Sterling, IV | |
| 5,818,437 A | 10/1998 | Grover et al. | |
| 5,875,446 A * | 2/1999 | Brown et al. | 1/1 |
| 5,880,722 A | 3/1999 | Brewer et al. | |
| 6,018,774 A | 1/2000 | Mayle et al. | |
| 6,028,603 A * | 2/2000 | Wang et al. | 715/776 |
| 6,097,389 A * | 8/2000 | Morris et al. | 715/804 |
| 6,137,945 A * | 10/2000 | McGrath | 386/282 |
| 6,160,553 A | 12/2000 | Robertson et al. | |
| 6,160,554 A * | 12/2000 | Krause | 715/804 |
| 6,173,287 B1 * | 1/2001 | Eberman et al. | 715/232 |
| 6,249,316 B1 | 6/2001 | Anderson | |
| 6,335,742 B1 * | 1/2002 | Takemoto | 715/781 |
| 6,363,373 B1 * | 3/2002 | Steinkraus | 1/1 |
| 6,374,260 B1 | 4/2002 | Hoffert et al. | |
| 6,400,378 B1 | 6/2002 | Snook | |
| 6,408,301 B1 | 6/2002 | Patton et al. | |
| 6,411,724 B1 * | 6/2002 | Vaithilingam et al. | 382/100 |
| 6,437,797 B1 | 8/2002 | Ota | |
| 6,476,826 B1 * | 11/2002 | Plotkin et al. | 715/723 |
| 6,487,360 B1 | 11/2002 | Sumiyoshi et al. | |
| 6,490,370 B1 * | 12/2002 | Krasinski et al. | 382/195 |
| 6,542,936 B1 | 4/2003 | Mayle et al. | |
| 6,545,687 B2 | 4/2003 | Scott et al. | |
| 6,564,225 B1 * | 5/2003 | Brogliatti et al. | 1/1 |
| 6,567,980 B1 * | 5/2003 | Jain et al. | 725/61 |
| 6,580,437 B1 * | 6/2003 | Liou et al. | 715/719 |
| 6,597,375 B1 * | 7/2003 | Yawitz | 715/723 |
| 6,629,104 B1 * | 9/2003 | Parulski et al. | 382/307 |
| 6,700,612 B1 | 3/2004 | Anderson et al. | |
| 6,734,909 B1 | 5/2004 | Terane et al. | |
| 6,760,916 B2 * | 7/2004 | Holtz et al. | 725/34 |
| 6,795,094 B1 * | 9/2004 | Watanabe et al. | 715/762 |
| 6,807,361 B1 | 10/2004 | Girgensohn et al. | |
| 6,816,272 B2 | 11/2004 | Oliver | |
| 6,851,091 B1 | 2/2005 | Honda et al. | |
| 6,871,231 B2 | 3/2005 | Morris | |
| 6,904,160 B2 | 6/2005 | Burgess | |
| 6,912,327 B1 * | 6/2005 | Hori et al. | 382/305 |
| 6,919,910 B2 | 7/2005 | Chang | |
| 6,941,325 B1 * | 9/2005 | Benitez et al. | 1/1 |
| 7,010,751 B2 * | 3/2006 | Shneiderman | 715/232 |
| 7,020,848 B2 | 3/2006 | Rosenzweig et al. | |
| 7,032,182 B2 * | 4/2006 | Prabhu et al. | 715/805 |
| 7,100,123 B1 | 8/2006 | Todd et al. | |
| 7,117,453 B2 * | 10/2006 | Drucker et al. | 715/833 |
| 7,143,353 B2 * | 11/2006 | McGee et al. | 715/723 |
| 7,146,576 B2 | 12/2006 | Chang et al. | |
| 7,162,488 B2 * | 1/2007 | DeVorchik et al. | 1/1 |
| 7,171,113 B2 * | 1/2007 | Parulski et al. | 396/287 |
| 7,197,751 B2 | 3/2007 | Fedotov et al. | |
| 7,203,367 B2 | 4/2007 | Shniberg et al. | |
| 7,212,666 B2 * | 5/2007 | Zhang et al. | 382/162 |
| 7,243,101 B2 | 7/2007 | Itou | |
| 7,296,242 B2 * | 11/2007 | Agata et al. | 715/793 |
| 7,353,234 B2 * | 4/2008 | Kimball et al. | 1/1 |
| 7,356,778 B2 * | 4/2008 | Hooper et al. | 715/841 |
| 7,370,065 B1 * | 5/2008 | Rys | 1/1 |
| 7,383,503 B2 * | 6/2008 | Banks | 715/273 |
| 7,403,642 B2 * | 7/2008 | Zhang et al. | 382/118 |
| 7,434,155 B2 * | 10/2008 | Lee | 715/203 |
| 7,437,005 B2 | 10/2008 | Drucker et al. | |
| 7,483,041 B2 * | 1/2009 | Langmacher et al. | 345/619 |
| 7,486,807 B2 * | 2/2009 | Nagahashi | 382/118 |
| 7,496,583 B2 * | 2/2009 | Moore et al. | 1/1 |
| 7,512,586 B2 * | 3/2009 | Kaasten et al. | 1/1 |
| 7,518,611 B2 * | 4/2009 | Boyd et al. | 345/473 |
| 7,555,165 B2 | 6/2009 | Luo et al. | |
| 7,587,680 B2 * | 9/2009 | Wada | 715/804 |
| 7,613,689 B2 * | 11/2009 | Arrouye et al. | 1/1 |
| 7,616,946 B2 * | 11/2009 | Park et al. | 455/414.1 |
| 7,623,755 B2 * | 11/2009 | Kuspa | 386/282 |
| 7,624,337 B2 * | 11/2009 | Sull et al. | 715/201 |
| 7,636,450 B1 * | 12/2009 | Bourdev | 382/100 |
| 7,644,356 B2 * | 1/2010 | Atkins et al. | 715/243 |
| 7,657,845 B2 * | 2/2010 | Drucker et al. | 715/833 |
| 7,680,340 B2 | 3/2010 | Luo et al. | |
| 7,683,940 B2 * | 3/2010 | Fleming | 348/222.1 |
| 7,689,915 B2 | 3/2010 | Kitamaru et al. | |
| 7,689,933 B1 * | 3/2010 | Parsons | 715/838 |
| 7,702,014 B1 * | 4/2010 | Kellock et al. | 375/240.08 |
| 7,707,517 B2 | 4/2010 | Bier et al. | |
| 7,716,157 B1 * | 5/2010 | Bourdev et al. | 1/1 |
| 7,743,064 B2 * | 6/2010 | Faulkner et al. | 707/758 |
| 7,747,074 B2 | 6/2010 | Yamakado et al. | |
| 7,770,117 B1 * | 8/2010 | Uy et al. | 715/726 |
| 7,779,358 B1 * | 8/2010 | Gupta et al. | 715/730 |
| 7,788,301 B2 * | 8/2010 | Brown et al. | 707/822 |
| 7,788,605 B1 * | 8/2010 | Shoemaker | 715/838 |
| 7,805,678 B1 * | 9/2010 | Niles et al. | 715/716 |
| 7,813,526 B1 * | 10/2010 | Bourdev | 382/103 |
| 7,813,557 B1 * | 10/2010 | Bourdev | 382/205 |
| 7,818,658 B2 * | 10/2010 | Chen | 715/201 |
| 7,823,055 B2 * | 10/2010 | Sull et al. | 715/201 |
| 7,836,091 B2 | 11/2010 | Deshpande | |
| 7,839,420 B2 | 11/2010 | Ubillos | |
| 7,844,036 B2 * | 11/2010 | Gardner et al. | 379/88.08 |
| 7,890,867 B1 * | 2/2011 | Margulis | 715/723 |
| 7,899,818 B2 | 3/2011 | Stonehocker et al. | |
| 7,904,814 B2 * | 3/2011 | Errico et al. | 715/725 |
| 7,945,653 B2 * | 5/2011 | Zuckerberg et al. | 709/223 |
| 7,954,056 B2 * | 5/2011 | Graham | 715/716 |
| 7,954,065 B2 * | 5/2011 | Ubillos | 715/793 |
| 7,978,936 B1 | 7/2011 | Casillas et al. | |
| 8,078,603 B1 * | 12/2011 | Chandratillake et al. | 707/706 |
| 8,121,358 B2 | 2/2012 | Weng et al. | |
| 8,161,452 B2 * | 4/2012 | Creighton et al. | 717/100 |
| 8,200,025 B2 | 6/2012 | Woodbeck | |
| 8,200,669 B1 | 6/2012 | Iampietro et al. | |
| 8,250,613 B2 * | 8/2012 | Faulkner et al. | 725/86 |
| 8,276,098 B2 | 9/2012 | Fagans et al. | |
| 8,289,562 B2 * | 10/2012 | Kitagawa | 358/1.18 |
| 8,300,953 B2 * | 10/2012 | Lindley et al. | 382/219 |
| 8,396,246 B2 * | 3/2013 | Anbalagan et al. | 382/100 |
| 8,611,678 B2 | 12/2013 | Hanson et al. | |
| 8,755,249 B2 * | 6/2014 | Aeron et al. | 367/32 |
| 8,843,375 B1 * | 9/2014 | Ubillos | 704/270 |
| 2001/0022621 A1 | 9/2001 | Squibbs | |
| 2001/0049826 A1 | 12/2001 | Wilf | |
| 2002/0000998 A1 | 1/2002 | Scott et al. | |
| 2002/0051262 A1 | 5/2002 | Nuttall et al. | |
| 2002/0055955 A1 * | 5/2002 | Lloyd-Jones et al. | 707/512 |
| 2002/0069218 A1 * | 6/2002 | Sull et al. | 707/501.1 |
| 2002/0107973 A1 | 8/2002 | Lennon et al. | |
| 2002/0109728 A1 | 8/2002 | Tiongson et al. | |
| 2002/0126143 A1 * | 9/2002 | Bae et al. | 345/723 |
| 2002/0133488 A1 | 9/2002 | Bellis et al. | |
| 2002/0143762 A1 | 10/2002 | Boyd et al. | |
| 2002/0163545 A1 | 11/2002 | Hii | |
| 2003/0002851 A1 * | 1/2003 | Hsiao et al. | 386/52 |
| 2003/0033296 A1 * | 2/2003 | Rothmuller et al. | 707/3 |
| 2003/0055810 A1 | 3/2003 | Cragun et al. | |
| 2003/0061610 A1 * | 3/2003 | Errico | 725/46 |
| 2003/0068161 A1 * | 4/2003 | Lasorsa et al. | 386/111 |
| 2003/0076322 A1 | 4/2003 | Ouzts et al. | |
| 2003/0084065 A1 | 5/2003 | Lin et al. | |
| 2003/0084087 A1 | 5/2003 | Berry | |
| 2003/0090504 A1 * | 5/2003 | Brook et al. | 345/716 |
| 2003/0093260 A1 | 5/2003 | Dagtas et al. | |
| 2003/0126212 A1 * | 7/2003 | Morris et al. | 709/205 |
| 2003/0146915 A1 | 8/2003 | Brook et al. | |
| 2003/0146939 A1 | 8/2003 | Petropoulos et al. | |
| 2003/0169288 A1 | 9/2003 | Misawa | |
| 2003/0177503 A1 * | 9/2003 | Sull et al. | 725/112 |
| 2003/0189588 A1 * | 10/2003 | Girgensohn et al. | 345/723 |
| 2004/0027624 A1 | 2/2004 | Parulski et al. | 358/527 |
| 2004/0046782 A1 * | 3/2004 | Ubillos | 345/723 |
| 2004/0143598 A1 * | 7/2004 | Drucker et al. | 707/104.1 |
| 2004/0189707 A1 | 9/2004 | Moore et al. | |
| 2004/0205633 A1 | 10/2004 | Martinez et al. | |
| 2004/0213553 A1 * | 10/2004 | Nagahashi | 386/69 |
| 2004/0255337 A1 * | 12/2004 | Doyle et al. | 725/135 |
| 2004/0268223 A1 | 12/2004 | Tojo | |
| 2005/0010953 A1 * | 1/2005 | Carney et al. | 725/61 |

(56) References Cited

U.S. PATENT DOCUMENTS

| | | | |
|---|---|---|---|
| 2005/0044100 A1 | 2/2005 | Hooper et al. | |
| 2005/0047681 A1* | 3/2005 | Hori et al. | 382/305 |
| 2005/0063613 A1 | 3/2005 | Casey et al. | |
| 2005/0078174 A1 | 4/2005 | Casey et al. | |
| 2005/0091596 A1 | 4/2005 | Anthony et al. | |
| 2005/0091612 A1 | 4/2005 | Stabb et al. | |
| 2005/0108620 A1 | 5/2005 | Allyn et al. | |
| 2005/0177562 A1 | 8/2005 | Raciborski | |
| 2005/0188326 A1* | 8/2005 | Ikeda | 715/788 |
| 2005/0192953 A1 | 9/2005 | Neale et al. | |
| 2005/0203884 A1 | 9/2005 | Allen et al. | |
| 2005/0206751 A1 | 9/2005 | Manico | |
| 2005/0216839 A1* | 9/2005 | Salvucci | 715/723 |
| 2005/0216840 A1* | 9/2005 | Salvucci | 715/723 |
| 2005/0223329 A1 | 10/2005 | Schwartz et al. | |
| 2005/0231512 A1* | 10/2005 | Niles et al. | 345/473 |
| 2005/0246331 A1* | 11/2005 | De Vorchik et al. | 707/3 |
| 2005/0246352 A1* | 11/2005 | Moore et al. | 707/100 |
| 2005/0246373 A1* | 11/2005 | Faulkner et al. | 707/104.1 |
| 2005/0246643 A1* | 11/2005 | Gusmorino et al. | 715/734 |
| 2005/0257240 A1* | 11/2005 | Faulkner et al. | 725/92 |
| 2005/0268223 A1 | 12/2005 | Hanson et al. | |
| 2005/0268279 A1 | 12/2005 | Paulsen | |
| 2005/0283734 A1 | 12/2005 | Santoro et al. | |
| 2006/0026523 A1 | 2/2006 | Kitamaru et al. | |
| 2006/0044401 A1 | 3/2006 | Park | |
| 2006/0047649 A1 | 3/2006 | Liang | |
| 2006/0064418 A1* | 3/2006 | Mierau et al. | 707/9 |
| 2006/0066752 A1 | 3/2006 | Kelliher | |
| 2006/0069998 A1* | 3/2006 | Artman et al. | 715/721 |
| 2006/0077461 A1* | 4/2006 | Camara et al. | 358/1.15 |
| 2006/0083480 A1* | 4/2006 | Nakamura et al. | 386/52 |
| 2006/0090359 A1 | 5/2006 | Bork | |
| 2006/0114338 A1 | 6/2006 | Rothschild | |
| 2006/0153535 A1 | 7/2006 | Chun et al. | |
| 2006/0155761 A1 | 7/2006 | VanDeSluis et al. | |
| 2006/0161872 A1* | 7/2006 | Rytivaara et al. | 715/864 |
| 2006/0187317 A1 | 8/2006 | Montulli et al. | |
| 2006/0200466 A1 | 9/2006 | Kaasten et al. | |
| 2006/0215987 A1 | 9/2006 | Horentrup et al. | |
| 2006/0218522 A1 | 9/2006 | Hanechak | |
| 2006/0224940 A1* | 10/2006 | Lee | 715/500.1 |
| 2006/0224993 A1 | 10/2006 | Wong et al. | |
| 2006/0230334 A1 | 10/2006 | Slawson et al. | |
| 2006/0239676 A1* | 10/2006 | Parulski et al. | 396/287 |
| 2006/0242178 A1* | 10/2006 | Butterfield et al. | 707/100 |
| 2006/0251339 A1 | 11/2006 | Gokturk et al. | |
| 2006/0259477 A1 | 11/2006 | Morita | |
| 2006/0265657 A1* | 11/2006 | Gilley | 715/730 |
| 2006/0277454 A1* | 12/2006 | Chen | 715/500.1 |
| 2007/0033170 A1* | 2/2007 | Sull et al. | 707/3 |
| 2007/0035551 A1 | 2/2007 | Ubillos | |
| 2007/0044010 A1* | 2/2007 | Sull et al. | 715/500.1 |
| 2007/0058932 A1 | 3/2007 | Wafler | |
| 2007/0079321 A1 | 4/2007 | Ott | |
| 2007/0098266 A1 | 5/2007 | Chiu et al. | |
| 2007/0112852 A1 | 5/2007 | Sorvari et al. | |
| 2007/0124752 A1* | 5/2007 | Sakai | 725/8 |
| 2007/0127833 A1 | 6/2007 | Singh | |
| 2007/0136755 A1* | 6/2007 | Sakai | 725/46 |
| 2007/0174269 A1* | 7/2007 | Jing et al. | 707/5 |
| 2007/0174790 A1* | 7/2007 | Jing et al. | 715/838 |
| 2007/0188626 A1 | 8/2007 | Squilla et al. | |
| 2007/0204238 A1* | 8/2007 | Hua et al. | 715/838 |
| 2007/0223878 A1 | 9/2007 | Abe et al. | |
| 2007/0226255 A1* | 9/2007 | Anderson | 707/104.1 |
| 2007/0244902 A1 | 10/2007 | Seide et al. | |
| 2007/0266019 A1 | 11/2007 | Lavi | |
| 2007/0288453 A1* | 12/2007 | Podilchuk | 707/5 |
| 2008/0002771 A1 | 1/2008 | Chen | |
| 2008/0037826 A1 | 2/2008 | Sundstrom et al. | |
| 2008/0044155 A1* | 2/2008 | Kuspa | 386/52 |
| 2008/0046845 A1 | 2/2008 | Chandra | |
| 2008/0065995 A1 | 3/2008 | Bell et al. | |
| 2008/0066107 A1* | 3/2008 | Moonka et al. | 725/42 |
| 2008/0071747 A1 | 3/2008 | Bohannon et al. | |
| 2008/0104019 A1 | 5/2008 | Nath | |
| 2008/0126191 A1* | 5/2008 | Schiavi | 705/14 |
| 2008/0127270 A1* | 5/2008 | Shipman et al. | 725/46 |
| 2008/0148152 A1 | 6/2008 | Blinnikka et al. | |
| 2008/0152297 A1* | 6/2008 | Ubillos | 386/52 |
| 2008/0152298 A1* | 6/2008 | Ubillos | 386/52 |
| 2008/0152299 A1* | 6/2008 | Ubillos | 386/52 |
| 2008/0155413 A1* | 6/2008 | Ubillos | 715/716 |
| 2008/0155420 A1* | 6/2008 | Ubillos et al. | 715/723 |
| 2008/0155421 A1* | 6/2008 | Ubillos et al. | 715/724 |
| 2008/0155458 A1 | 6/2008 | Fagans et al. | |
| 2008/0163084 A1* | 7/2008 | Gottlieb et al. | 715/762 |
| 2008/0170781 A1 | 7/2008 | Woolgar | |
| 2008/0174676 A1 | 7/2008 | Squilla et al. | |
| 2008/0229248 A1 | 9/2008 | Fagans et al. | |
| 2008/0288869 A1 | 11/2008 | Ubillos | |
| 2008/0294974 A1* | 11/2008 | Nurmi et al. | 715/204 |
| 2008/0304755 A1 | 12/2008 | Xiao et al. | |
| 2008/0304808 A1 | 12/2008 | Newell et al. | |
| 2008/0310688 A1 | 12/2008 | Goldberg | |
| 2009/0031246 A1 | 1/2009 | Cowtan et al. | |
| 2009/0044133 A1 | 2/2009 | Goto et al. | |
| 2009/0135274 A1 | 5/2009 | Kim et al. | |
| 2009/0148068 A1 | 6/2009 | Woodbeck | |
| 2009/0172543 A1* | 7/2009 | Cronin et al. | 715/721 |
| 2010/0066822 A1 | 3/2010 | Steinberg et al. | |
| 2011/0055284 A1 | 3/2011 | Wallace et al. | |
| 2011/0055749 A1 | 3/2011 | Wallace et al. | |
| 2011/0064317 A1 | 3/2011 | Ubillos | |
| 2011/0093492 A1* | 4/2011 | Sull et al. | 707/769 |
| 2011/0167462 A1* | 7/2011 | O'Connor et al. | 725/110 |
| 2011/0196888 A1 | 8/2011 | Hanson et al. | |
| 2011/0234613 A1 | 9/2011 | Hanson et al. | |
| 2011/0235858 A1 | 9/2011 | Hanson et al. | |
| 2012/0096361 A1 | 4/2012 | Osten | |
| 2012/0297334 A1 | 11/2012 | Fagans et al. | |
| 2012/0299955 A1 | 11/2012 | Fagans et al. | |

FOREIGN PATENT DOCUMENTS

| | | |
|---|---|---|
| EP | 1283482 | 2/2003 |
| EP | 1377047 A2 | 1/2004 |
| EP | 1566752 | 8/2005 |
| EP | 1638102 A1 | 3/2006 |
| EP | 1729263 | 12/2006 |
| JP | 03-234243 | 10/1991 |
| JP | 9027937 | 1/1997 |
| JP | 2002259410 A | 9/2002 |
| JP | 04-274260 | 9/2004 |
| JP | 2008131330 A | 6/2008 |
| JP | 2008146191 A | 6/2008 |
| WO | WO 01/75645 | 10/2001 |
| WO | WO 2005/001658 | 1/2005 |
| WO | WO 2005/001714 | 1/2005 |
| WO | WO 2008/079750 | 7/2008 |

OTHER PUBLICATIONS

Non-Final Office Action in U.S. Appl. No. 11/771,761 dated Sep. 29, 2010, 19 pages.

Office Action in corresponding European Application No. 07854829.4, mailed Jul. 2, 2010, 5 pages.

Office Action in corresponding Chinese Application No. 200780051673.8, mailed Sep. 10, 2010, 6 pages.

International Search Report and Written Opinion in corresponding PCT Application No. PCT/US07/085939, mailed on Jul. 31, 2008, 12 pages.

International Preliminary Report on Patentability in corresponding PCT Application No. PCT/US07/085939, mailed on Jul. 2, 2009, 7 pages.

Chinese Notification of the First Office Action (with English translation) for Application No. 200780051294.9 dated Feb. 6, 2012, 9 pages.

U.S. Final Office Action for U.S. Appl. No. 12/185,022 mailed Feb. 15, 2012, 14 pages.

Non-Final Office Action for U.S. Appl. No. 12/185,022 mailed Sep. 28, 2011, 26 pages.

(56) References Cited

OTHER PUBLICATIONS

Chinese Notification of Reexamination Decision of CN Application No. 200780051673.8 on Jan. 28, 2014; 10 pages.
Chinese Office Action in Application No. 200780051673.8 dated Apr. 15, 2014, 16 pages.
Summons to attend oral proceedings pursuant to Rule 115(1) EPC for EP Application No. 07854829.4 on Dec. 19, 2013, 7 pages.
Anonymous: "Final Cut Pro Quickie: Scrubbing Thumbnails in the Browser Creative Workflow Hacks", Oct. 11, 2006, pp. 1-8, XP55089996, URL:http://www.creative-workflow-hacks.com/2006/10/11/final-cut-pro-quickie-scrubbing-thumbnails-in-th-browser/.
Piotr Kaminski et al: Video Bench—Final Report:, Internet Citation, Apr. 11, 2003, XP002662427, URL:http://www.ideanest.com/videobench/Report.pdf., 47 pages.
Final Cut Pro 5 User Manual:, Internet Citation, 2005, XP003017001, retrieved from the internet: URL:http://www.manuals.info.apple.com/en/Final_Cut_Pro_5_User-Manual.pdf, 94 pages.
Adelman, Kenneth & Gabrielle, California Coastal Protection Network, California Coastal Records Project—Aerial Photographs of the California Coastline retrieved from: http://www.californiacoastline.org/,' [online] retrieved on Jul. 5, 2007], 1 page.
Anonymous: ""Indexing and recall of capture events"". Research Disclosure. Mason Publication. Hampshire. GB. vol. 422. No. 66. Jun. 1, 1999. XP007124469 ISSN: 0374-4353, 1 page.
Brian K. Smith et al., Inquiry with imagery: historical archive retrieval with digital cameras, Proceedings of the seventh ACM international conference on Multimedia (Part 1), p. 405-408, Oct. 30-Nov. 5, 1999, Orlando, Florida, US.
Cato, "Digital Camera with Global Positioning Satellite to Record Location with Image", IBM Technical Disclosure, Sep. 1, 1998, 2 pages.
Hewagamage. K.P. et al., "Augmented Album: situation-dependent system for a personal digital video/image collection"; Multimedia and Expo. 2000. ICME 2000. 2000 IEEE International Conference on New York. NY. USA. Jul. 30-Aug. 2, 2000. Piscataway. NJ. USA. IEEE. US. vol. 1. Jul. 30, 2000. pp. 323-326.
hppt://www.californiacoastline.org. California Coastal Records Project. ""About the Project"". Photography and website. Copyright© 2002-2006 Kenneth & Gabrielle Adelman. Adelman@Adelman.com, 4 pages.
O'Hare et al., My digital photos: where and when?, ACM Multimedia 2005—13th ACM International Conference on Multimedia 2005, Nov. 6-12, 2005, Singapore, 2 pages.
Sony GPS tracker for photographers, Aug. 2, 2006, 4 pages.
Vailaya, A. et al., Image classification for content based indexing, IEEE Trans. Image Process. 10, 1, 117-130. Aug. 11, 2000.
Chinese notification of office action issued in Chinese application No. 200780051294.9 on Jun. 5, 2013, 17 pages.
International Search Report and the Written Opinion of the International Searching Authority for International Application No. PCT/US2007/087660. Filed Dec. 14. 2007. Mailed Jul. 30. 2008. Published by the European Patent Office, 25 pages.
International Search Report and the Written Opinion of the International Searching Authority for International Application No. PCT/US2008/056656. Filed Mar. 12. 2008. Mailed Aug. 1. 2008. Published by the European Patent Office, 23 pages.
Japanese office action (with English translation) for Application No. 2010-0520035 dated Mar. 21, 2013, 15 pages.
Office Action for U.S. Appl. No. 11/685,672 dated Jan. 25, 2011 (13 pages).
Office Action for U.S. Appl. No. 11/685,672 dated Nov. 4, 2011 (13 pages).
Office Action for U.S. Appl. No. 11/760,684 dated Dec. 8, 2010 (20 pages).
Office Action for U.S. Appl. No. 11/760,684 dated Jun. 23, 2011 (15 pages).
Office Action for U.S. Appl. No. 11/760,684 dated Mar. 7, 2012 (14 pages).
Office Action for U.S. Appl. No. 11/760,684 dated Mar. 8, 2010 (17 pages).
Office Action for U.S. Appl. No. 11/834,589 dated Apr. 29, 2010, 13 pages.
Office Action for U.S. Appl. No. 11/834,589 dated Nov. 18, 2011, 16 pages.
Office Action for U.S. Appl. No. 11/834,589 dated Nov. 29, 2010, 14 pages.
Office Action for U.S. Appl. No. 12/703,620 dated Feb. 9, 2012 (33 pages).
Office action for U.S. Appl. No. 12/891,252 dated Feb. 6, 2013, 32 pages.
Office Action for U.S. Appl. No. 12/891,252 dated Jun. 19, 2013, 19 pages.
Office action for U.S. Appl. No. 13/565,700 issued on Aug. 29, 2013, 14 pages.
Office action issued in U.S. Appl. No. 12/185,022 on Aug. 13, 2014, 21 pages.
Office action issued in U.S. Appl. No. 12/185,022 on Dec. 24, 2014, 15 pages.
Office action issued in U.S. Appl. No. 13/565,700 on May 5, 2014, 11 pages.
Office action issued in U.S. Appl. No. 13/565,700 on Nov. 20, 2014, 21 pages.
Summons to attend oral proceedings pursuant to Rule 115(1) EPC received in EP Application No. 07855192.6 on May 15, 2013, 6 pages.

\* cited by examiner

ASSOCIATING KEYWORDS TO MEDIA

CROSS REFERENCE TO RELATED APPLICATION

This application claims the benefit of the filing date of U.S. Provisional Application Ser. No. 60/871,740, filed on Dec. 22, 2006, and entitled "Two-Dimensional Timeline", the entire disclosure of which is incorporated herein by reference.

TECHNICAL FIELD

In general, this document describes systems and techniques for editing video clips using video editing software.

BACKGROUND

Scenes in motion can be captured and recorded using a variety of devices ranging from state-of-the-art professional video cameras used in television and movie-making to simple cameras on cellular telephones. Some of the devices that can be used to capture motion pictures, including digital camcorders and digital cameras, also allow storing the captured images in digital format including the moving picture experts group (MPEG) format. Depending on device capabilities and user settings, a camera can capture and store both audio and video. The recorded information is automatically stored in digital format and can be easily transported to secondary devices including hard disks in computers using various wired or wireless communications protocols such as bluetooth or universal serial bus (USB) based devices.

Video editing software, such as iMovie HD 6.0.1, provides a user in possession of a large repository of video clips with non-linear editing techniques to edit raw footage. Such editing includes cutting segments of the footage, re-arranging segments of the same video clip, re-arranging and combining segments of multiple video clips, and categorizing segments of video clips by associating keywords to one or more segments. Software manufacturers regularly add features to the software so that the software is simple to operate for an average user, while providing a near-professional quality to the finished video.

SUMMARY

In one example, a user can display media items (e.g., video clips, photographs, audio clips, and the like) as one or more thumbnail groups, categorize segments of the media items by assigning keywords to all or segments of a thumbnail group, and filter the display to view all or segments of media items based on one or more keywords assigned to the one or more segments of the thumbnail groups.

In one aspect, a computer-implemented method is described. The method includes displaying, within a user interface in a digital media system, a media pane and a tools pane, displaying, within the media pane, a thumbnail group representing a media item, the thumbnail group comprising one or more thumbnails, displaying, within the tools pane, a tool configured to assign a keyword, and enabling a user to assign the keyword to a selected segment of the thumbnail group by activating the tool.

This, and other aspects, can include one or more of the following features. Assigning the keyword can include enabling a user to first select the segment of the thumbnail group, and enabling the user to then activate the tool to associate the keyword to the selected segment. Assigning the keyword can include enabling a user to first select the keyword by activating the tool, and enabling the user to then select the segment of the thumbnail group to which the selected keyword is associated. The selected segment can be highlighted. One or more media items can be displayed within the media pane, the one or more media items including one or more of digital or digitized video clips and photographs. The segment can be selected by enabling a user to perform operations including selecting a starting position on the thumbnail group using a pointer, and selecting an ending position on the thumbnail group using the pointer. The starting position can correspond to a first frame in the media item and the ending position can correspond to a second frame in the media item. The ending position can be independent of the starting position. The method can further include altering a position of the pointer on the thumbnail group based on user input. The method can further include displaying the pointer, when placed on the thumbnail group, as a vertical line of length equal to a vertical dimension of the thumbnail group. The activating can further include placing a pointer on the tool and selecting the tool. The method can further include displaying a keyword tool in the user interface, and displaying a keyword palette upon activating the keyword tool. The method can further include displaying within the keyword palette a keyword region, the keyword region comprising a new keyword and a check box associated with the new keyword. The method can further include assigning the new keyword to a new segment of the thumbnail group. Assigning the new keyword to the new segment can include enabling a user to first select the new segment, and enabling the user to then select the check box associated with the new keyword to associate the new keyword to the new segment. Assigning the new keyword to the new segment can include enabling a user to first select the check box associated with the new keyword, and enabling the user to then select the new segment to which the new keyword is associated. The method can further include displaying within the keyword palette a word box, the word box configured to receive keywords from a user for inclusion in the keyword palette. The included keyword can be displayed in the keyword region and a check box associated with the included keyword can be displayed adjacent to the included keyword. More than one segment of the thumbnail group can be selected. More than one keyword can be assigned to a same segment and more than one segment can be assigned a same keyword. The method can further include displaying, within the user interface, a filter tool, enabling a user to filter the display of the more than one selected segments based on the keyword associated with each segment by activating the filter tool. The filtering can further include selecting a keyword in the filter palette by selecting the check box associated with the keyword in the filter palette. The filtering can further include performing an editing operation on the one or more segments assigned the keyword, the editing operations including one of displaying only the one or more segments, hiding only the one or more segments, and transferring the one or more segments to a project pane on the user interface. Activating the filter tool can include displaying a filter palette, the filter palette including the one or more keywords assigned to the one or more segments in the thumbnail group, and a check box associated with each keyword. The filter palette can further include a boolean tool, the boolean tool configured to perform an editing operation on the one or more segments assigned the one or more keywords, the editing operations including one of displaying only the one or more segments, hiding only the one or more segments, and transferring the one or more segments to a project pane on the user interface. The boolean tool can be configured to perform boolean AND operation. The boolean tool can be configured to perform boolean OR operation.

In another aspect, a medium bearing instructions to enable one or more machines to perform operations is described. The operations include displaying, within a user interface in a digital media system, a media pane and a tools pane, displaying, within the media pane, a thumbnail group representing a media item, the thumbnail group comprising one or more thumbnails, displaying, within the tools pane, a tool configured to assign a keyword, and enabling a user to assign the keyword to a selected segment of the thumbnail group by activating the tool.

This, and other aspects, can include one or more of the following features. Assigning the keyword can include enabling a user to first select the segment of the thumbnail group, and enabling the user to then activate the tool to associate the keyword to the selected segment. Assigning the keyword can include enabling a user to first select the keyword by activating the tool, and enabling the user to then select the segment of the thumbnail group to which the selected keyword is associated. The selected segment can be highlighted. One or more media items can be displayed within the media pane, the one or more media items including one or more of digital or digitized video clips and photographs. The segment can be selected by enabling a user to perform operations including selecting a starting position on the thumbnail group using a pointer, and selecting an ending position on the thumbnail group using the pointer. The starting position can correspond to a first frame in the media item and the ending position can correspond to a second frame in the media item. The ending position can be independent of the starting position. The operations can further include altering a position of the pointer on the thumbnail group based on user input. The operations can further include displaying the pointer, when placed on the thumbnail group, as a vertical line of length equal to a vertical dimension of the thumbnail group. The activating can further include placing a pointer on the tool and selecting the tool. The operations can further include displaying a keyword tool in the user interface, and displaying a keyword palette upon activating the keyword tool. The operations can further include displaying within the keyword palette a keyword region, the keyword region comprising a new keyword and a check box associated with the new keyword. The operations can further include assigning the new keyword to a new segment of the thumbnail group. Assigning the new keyword to the new segment can include enabling a user to first select the new segment, and enabling the user to then select the check box associated with the new keyword to associate the new keyword to the new segment. Assigning the new keyword to the new segment can include enabling a user to first select the check box associated with the new keyword, and enabling the user to then select the new segment to which the new keyword is associated. The operations can further include displaying within the keyword palette a word box, the word box configured to receive keywords from a user for inclusion in the keyword palette. The included keyword can be displayed in the keyword region and a check box associated with the included keyword can be displayed adjacent to the included keyword. More than one segment of the thumbnail group can be selected. More than one keyword can be assigned to a same segment and more than one segment can be assigned a same keyword. The operations can further include displaying, within the user interface, a filter tool, enabling a user to filter the display of the more than one selected segments based on the keyword associated with each segment by activating the filter tool. The filtering can further include selecting a keyword in the filter palette by selecting the check box associated with the keyword in the filter palette. The filtering can further include performing an editing operation on the one or more segments assigned the keyword, the editing operations including one of displaying only the one or more segments, hiding only the one or more segments, and transferring the one or more segments to a project pane on the user interface. Activating the filter tool can include displaying a filter palette, the filter palette including the one or more keywords assigned to the one or more segments in the thumbnail group, and a check box associated with each keyword. The filter palette can further include a boolean tool, the boolean tool configured to perform an editing operation on the one or more segments assigned the one or more keywords, the editing operations including one of displaying only the one or more segments, hiding only the one or more segments, and transferring the one or more segments to a project pane on the user interface. The boolean tool can be configured to perform boolean AND operation. The boolean tool can be configured to perform boolean OR operation.

The system and techniques described here can present one or more of the following advantages. A user possessing a large repository of video clips can identify good segments and bad segments by scanning a cursor across the thumbnail groups and selecting starting and ending positions for the segments. This can allow a user to perform coarse editing operations on all the video clips. Further, a user can specify categories for segments of the video clips. A user can assign one or more keywords to segments of thumbnail groups representing video clips. Subsequently, a user can view all segments of video clips that have been assigned the same keywords. Upon assigning keywords to all or segments of video clips, a user can display or hide, as the user chooses, segments of video clips based on the keywords. For example, a user can display or hide video clips that have been assigned the same keyword. Simple Boolean logic can be employed to filter (e.g., hide or display) the video clips based on the keywords that a user can assign to the video clips.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
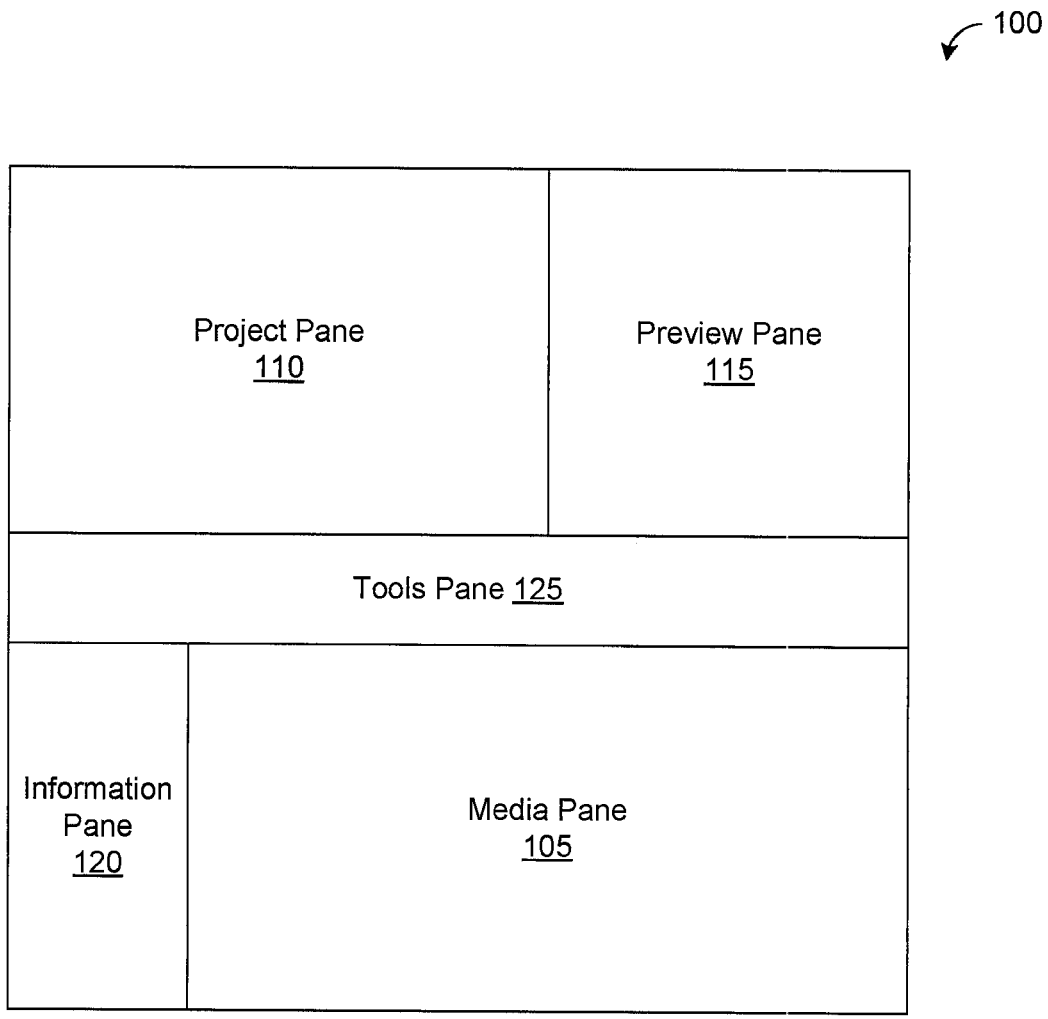
FIG. 1 is an example of a user interface to perform video editing.

FIG. 1 depicts an example of a schematic of a user interface 100 to perform video editing. The user interface 100 includes a media pane 105, a project pane 110, a preview pane 115, an information pane 120, and a tools pane 125. Video clips containing raw footage recorded using a recording instrument are uploaded into the user interface 100 and displayed in the media pane 105. In some implementations, the video clips containing raw footage may be stored on a storage device such as a video library. When the user interface is opened, the system can display the available video libraries in the information pane 120. In other implementations, when the user interface is opened, the system can automatically search the storage device for video clips and display all available video clips in the media pane 105. In other implementations, the system can retrieve stored video clips based on user input. All video clips selected by the user can be uploaded into the user interface 100 and displayed in the media pane 105 regardless of the type of the video clip or the recording instrument. The video clips can be recorded using any recording instrument including digital camcorders, digital cameras, and cellular telephones. The video clips can be stored in any format including quicktime, mpeg-1, mpeg-2, AVI, and real video. In addition, the time period of each video clip can be displayed on or adjacent to a corresponding video clip.

The project pane 110 includes one or more segments from one or more of the video clips displayed in the media pane 105 that can be selected by the user for editing. When segments are selected and transferred from the media pane 105 to the project pane 110, a project is automatically created. In some implementations, a pane displaying projects can be displayed adjacent to the project pane 110. Subsequent to editing, the contents of a project pane 110 can be saved as a finished project. A finished project can be saved in any format including quicktime, AVI, mpeg-1, mpeg-2, and real, regardless of the format of the video from which each segment in the project was obtained. A saved project can be re-opened for further editing. In addition, the project pane 105 can also include representations to indicate additional content including audio tracks, voice-overs, titles, transitions between frames, and the like.

Video in a video clip is stored as a sequence of frames. The preview pane 115 displays frames, wherein a frame is one of the plurality of photographic images in a motion picture. A frame displayed in the preview pane 115 corresponds to a time instant in the video clip. The preview pane 115 can display frames corresponding to content displayed in the media pane 105 and content displayed in the project pane 110. In addition, the preview pane 115 plays back video content displayed in the media pane 105 and in the project pane 110, based on user input. Based on system capabilities, the content played back in the preview pane 115 can include audio content recorded along with the video content or added to the raw footage. A user can preview the effect of editing the video content in the preview pane 115.

In some implementations, the information pane 120 can display data including metadata related to the one or more video clips in the media pane 105. For example, the information pane 120 can display the name of the video clip, the location where the video clip is stored, the time when the video clip was recorded, the duration of the clip, the size of the clip (e.g., in megabytes), and the like. In some implementations, the information pane 120 can display the metadata related to all the video clips in the media pane 105. In other implementations, the information pane 120 can display the metadata related to the video clip that a user is editing. The information pane 120 can continuously be updated as video clips are added, deleted, or edited. In some implementations, the user can hide the information pane 120 from display. In such implementations, the horizontal dimension of the media pane 105 can be automatically adjusted to occupy the void created by hiding the information pane 120. The user interface 100 can include a tools pane 125. The tools pane 125 can include user interface controls that a user can activate to perform editing operations including assigning keywords.

In some implementations, the media pane 105 and the information pane 120 can be arranged adjacent to each other in the same row. A tools pane 125 can be positioned above the media pane 105 and the information pane 120 such that the horizontal dimension of the tools pane 125 equals the sum of the horizontal dimensions of the media pane 105 and the information pane 120. The project pane 110 and the preview pane 115 can be positioned above the tools pane 125 such that the sum of the horizontal dimensions of the project pane 110 and the preview pane 115 equals the horizontal dimension of the tools pane 125. Alternatively, the panes can be positioned in a different arrangement. A user can alter the dimensions of each pane by altering the dimensions of the user interface 100. Alternatively, the user can individually alter the dimensions of each pane. For example, a user can increase the vertical dimension of the tools pane 125. This may cause the dimensions of the project pane 110 and the preview pane 115 to be altered such that the dimensions of the user interface 100 remain unaltered. Alternatively, an alteration to the dimensions of one of the panes can cause the dimensions of all the panes and the user interface 100 to be uniformly altered. In some implementations, a user can hide panes from being displayed. In such implementations, the dimensions of one or more of the displayed panes may automatically be altered to occupy the void created by the hidden pane, such that the display of the user interface 100 is substantially rectangular in shape. A pane can be included in the user interface 100 based on user input. The dimensions of the displayed panes can automatically be adjusted to accommodate the added pane such that the dimensions of the user interface 100 remain unaltered and the display of the user interface 100 remains substantially rectangular in shape.

Figure 2A:
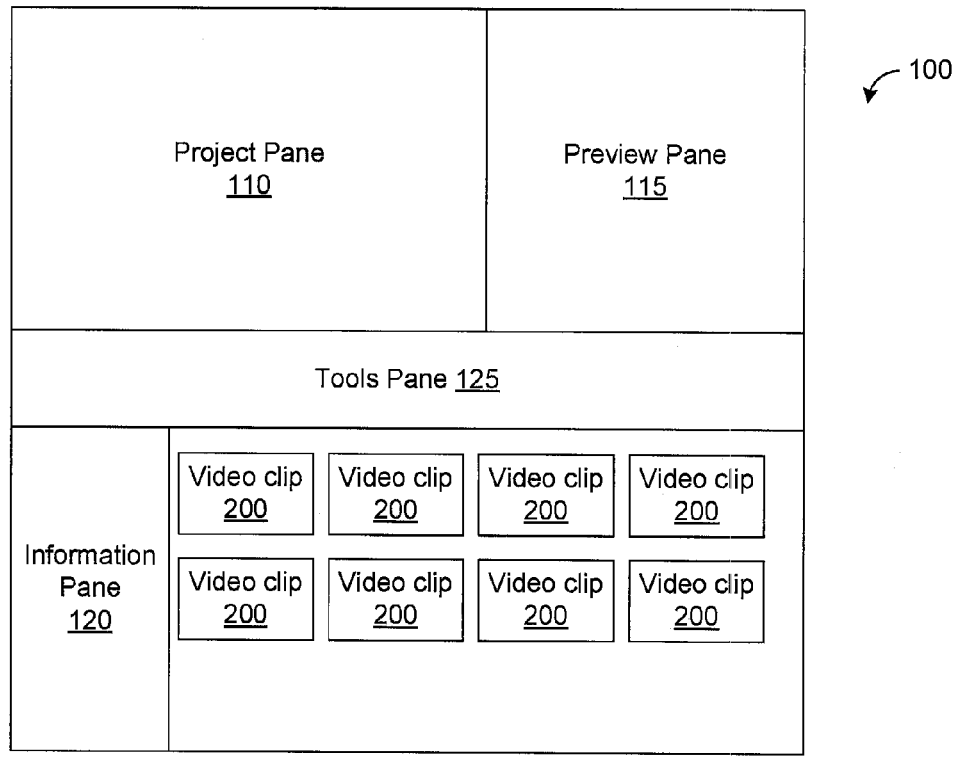
FIG. 2A is an example of a schematic of a user interface displaying each video clip as a thumbnail.

FIG. 2A depicts an example of a schematic of a user interface 100 displaying each video clip 200 as a thumbnail. A video clip 200 includes the content recorded by a recording instrument from the instant the recording feature is turned on to the instant the recording feature is turned off. In addition, a video clip 200 can include digitized clips, e.g., video tape converted into digital format, and the like. When the video clips 200 in a video library are uploaded into the user interface 100, each video clip 200 is displayed as one or more rows of rectangular thumbnails. The time line of a video clip 200 runs from left to right and top to bottom. In some implementations, each video clip 200 can be represented by a single rectangular thumbnail with a system defined distance separating each thumbnail to distinguish between video clips. Thumbnails are displayed in a first row until the sum of the horizontal dimensions of the thumbnails exceed the horizontal dimension of the media pane 105 displayed. Subsequent thumbnails are wrapped to the next row in the media pane 105. A gutter, which is a system designated space, separates two rows of thumbnails.

Figure 2B:
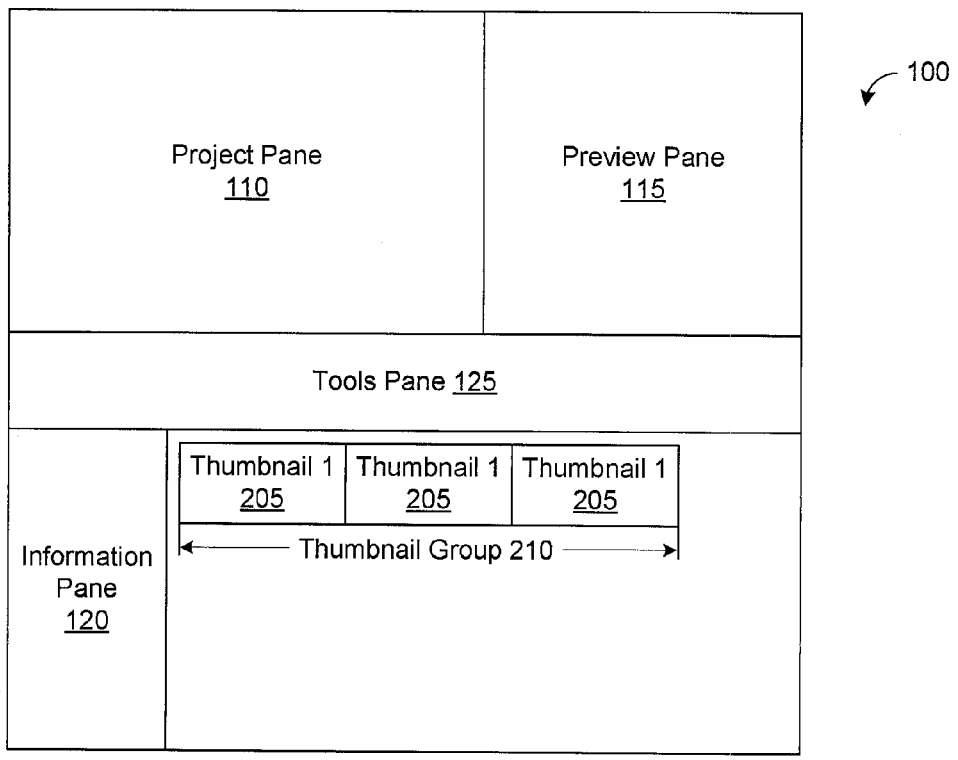
FIG. 2B is an example of a schematic of a user interface displaying a video clip as a thumbnail group.

FIG. 2B depicts an example of a schematic of a user interface 100 displaying a video clip 200 as a thumbnail group 210. The thumbnail group 210 collectively representing the video clip is displayed as a continuous sequence of one or more rectangular thumbnails 205. The vertical and horizontal dimensions of each thumbnail 205 are designated by the system. Each video clip 200 is collectively represented by a thumbnail group 210. Each thumbnail group 210 can include one or more thumbnails 205. Thumbnails 205 related to the same thumbnail group 210 are displayed as a continuous sequence. Thumbnail groups 210 corresponding to separate video clips are displayed such that the last thumbnail 205 of a thumbnail group 210 is separated from the first thumbnail 205 of the subsequent thumbnail group 210. The order of display of the thumbnails in the thumbnail group corresponds to the order in which the corresponding video clips were stored on the storage device. Progression of time corresponds to positioning of the thumbnails going from left to right in the horizontal direction and top to bottom in the vertical direction. A video clip 200 can be included to or removed from display in the user interface 100 based on user input. When a thumbnail group 210 corresponding to a video clip 200 is hidden, then the remaining thumbnail groups 210 are re-arranged to fill the gaps corresponding to the hidden thumbnail group 210. In this manner, the thumbnail groups 210 are displayed in a manner analogous to words in a word processing application user interface.

Each thumbnail 205 is assigned a segment of the time period of video content in the video clip 200. The duration of a video clip 200 is divided by the time period assigned to each thumbnail 205. In this manner, the number of thumbnails 205 in a thumbnail group 210 required to display the video clip 200 is determined. The duration of a video clip 200 may be exactly divisible by the time period assigned to each thumbnail 205 with no remaining time. In such cases, when the duration of the video clip 200 is divided by the time assigned to each thumbnail 205, the number of thumbnails 205 in a thumbnail group 210 required to display the video clip 200 equals the quotient of division (Q) with no time remaining. The video clip 200 is displayed across Q thumbnails 205 in the thumbnail group 210. Alternatively, there may be time remaining after dividing the total time period of the video clip 200 by the time period assigned to each thumbnail 205. In such cases, the number of thumbnails 205 in the thumbnail group 210 required to display the video clip 200 equals the quotient of the division (Q) plus one. The video clip 200 is displayed across (Q+1) thumbnails 205 in the thumbnail group 210. Also, in such cases, the time period corresponding to the last thumbnail 205 in the thumbnail group 210 is less than that corresponding to the other thumbnails 205 in the thumbnail group 210. Nevertheless, the dimensions of all the thumbnails 205 in the thumbnail group 210 related to a video clip 400 are uniform. In some implementations, the segment corresponding to the last thumbnail 205 is automatically distributed across the entire horizontal dimension of the last thumbnail 205. In other implementations, based on the time period corresponding to the last thumbnail 205, the video clip 200 is distributed across all the thumbnails 205 in the thumbnail group 210 such that each thumbnail 205 in the group 210 represents equal duration of content. In other implementations, the segment of the last thumbnail 205 of the video clip 200 containing no video content is filled with a color, for example, grey, when the cursor on the display device is placed on the thumbnail. In this manner, a user can readily discern that the filled segment of the last thumbnail 205 of a thumbnail group 210 is void of any video content. The segment of the thumbnail 205 void of content is not used during editing. The aesthetics of the user interface 100 are improved by keeping the dimensions of all the thumbnails 205 in the thumbnail group 210 uniform and avoiding the display of fractionated thumbnails 205 to represent content of shorter time periods.

A user can alter the time period assigned to the thumbnails 205 in the user interface 100. The thumbnails 205 in the project pane 110 can be assigned a different time period than the thumbnails 205 in the media pane 105. In some implementations, a first interactive scale and a second interactive scale are displayed adjacent to the media pane 105 and the project pane 110, respectively. The scales are operatively coupled to the respective panes such that the time assigned to thumbnails in the media pane 105 and that assigned to the thumbnails in the project pane 110 can be independently altered by sliding the first scale and the second scale, respectively. In some implementations, the time period corresponding to each thumbnail 205 is assigned by the system. In other implementations, the time period corresponding to each thumbnail 205 is specified by the user. In other implementations, when a video clip 200 is first loaded into the media pane 105, each thumbnail 205 is assigned a time period that is equal to a system default value. A user can alter this value to a user-defined value within limits specified by the system.

The vertical and horizontal dimensions of the thumbnails 205 are uniform and are designated by the system. The dimensions of the media pane 105 and the project pane 110 may be insufficient to display all the thumbnails 405 related to one or more thumbnail groups 210 in the same row. In some implementations, an interactive scale is displayed adjacent to the media pane 105 and the project pane 110. The scale is operatively coupled to the dimensions of the thumbnails in the media pane 105 and the project pane 110. A user can change the position of the scale to increase or decrease the size of the thumbnails 205 in the media pane 105 and the project pane 110. In this manner, the size of the thumbnails 205 displayed in the media pane 105 and the project pane 110 can be simultaneously altered. In other implementations, the size of the media pane 105 is automatically increased to accommodate all thumbnails 205 by adding rows. Nevertheless, the dimensions of the media pane 105 displayed remain unaltered. A vertical scroll bar is incorporated into the media pane 105 so that the user may scroll vertically to access video clips 200 that are not immediately viewed. In other implementations, the user can pan the media pane 105 using the pointing device or the keyboard or both. The size of display of the thumbnails 205 can also be altered by a combination of resizing thumbnails using an interactive scale and increasing the size of the media pane 105.

Figure 3:
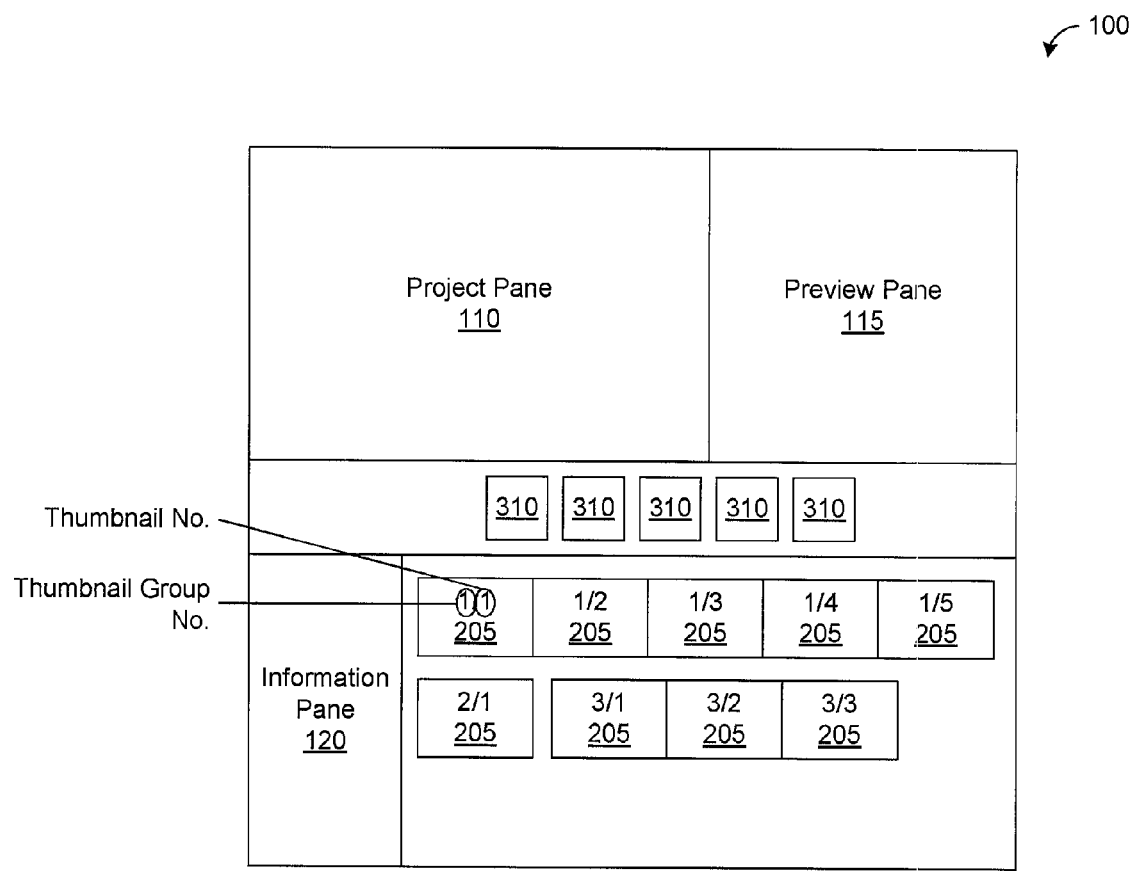
FIG. 3 is an example of a schematic of a user interface displaying a plurality of video clips as corresponding thumbnail groups.

FIG. 3 depicts an example of a schematic of a user interface 100 displaying a plurality of video clips 200 as corresponding thumbnail groups 210. Each thumbnail group 210 includes one or more thumbnails 205. In some implementations, all video clips 200 of a video library can be automatically uploaded into the user interface 100 and displayed in the media pane 105 as rows of thumbnail groups 210. In other implementations, one or more video clips 200 of a video library can be selectively uploaded into the user interface 100, based on user input, and displayed in the media pane 105. The default dimensions of the user interface 100 are designated by the system. Based on the time period assigned to a thumbnail 205 and based on the duration of a video clip 200, each video clip 200 is distributed across one or more thumbnails 205 in a thumbnail group 210. In the example shown, in the default view of the user interface 100, the thumbnail groups 1, 2, 3, and 4 correspond to video clips 1, 2, 3, and 4 which are displayed across 6, 1, 3, and 1 thumbnails, respectively. If the total horizontal dimension of the thumbnails 205 in a row exceeds that of the media pane 105, a new row is added, and subsequent thumbnails 205 are wrapped within the media pane 105 and displayed in the following row. The size of the thumbnails in the media pane 105 and the project pane 110 can be altered proportionally based on user input.

The number of thumbnails 205 in a thumbnail group 210 to display the video clips 200 is automatically altered based on the time period assigned to each thumbnail 205. When a video clip 200 is displayed across one or more thumbnails 205 in a thumbnail group 210, the time periods corresponding to each thumbnails 205 are equal to one another, except for the last thumbnail 205 in each thumbnail group 210. The time period corresponding to the last thumbnail 205 in a thumbnail group 210 is either less than or equal to, but not greater than, the time period corresponding to other thumbnails 205 in the same thumbnail group 210. Alternatively, the duration of a video clip 200 can be distributed equally across all the thumbnails in a thumbnail group. In such cases, the time period associated with a thumbnail in a first thumbnail group may be different from the time period associated with a thumbnail in a second thumbnail group. Each video clip 200 can be displayed as a single thumbnail 205 in response to user input. In such implementations, the dimensions of the thumbnails 205 corresponding to the video clips 200 are equal to one another. The duration of the video clips 200 represented by a thumbnail 205 need not be equal to one another.

When a cursor on the display device is placed over a thumbnail 205 in the user interface 100, a playhead is displayed on the display device at the position of the cursor. In some implementations, the playhead is a vertical line of height equal to the vertical dimension of the thumbnail 205. When the cursor is placed at a position away from a thumbnail 205, the playhead disappears. A user may alter the position of the cursor on the display device by operating the pointing device or the key board or both. When the playhead is positioned at a position on a thumbnail 205, a frame in the video corresponding to a time instant determined by the position of the playhead in the thumbnail is displayed in the preview pane 115. In addition, the frame corresponding to the position of the cursor is also displayed in the bounded region of the thumbnail on which the cursor is placed. In this manner, frames related to video content displayed across one or more thumbnails in the media pane 105 and the project pane 110 can be previewed in the preview pane 115.

When the playhead is positioned on a thumbnail 205, a frame in the video clip 200 corresponding to the position of the playhead is displayed on the thumbnail 205. As the playhead is moved across the thumbnail 205, the display on the thumbnail 205 is continuously updated with the frame corresponding to the new position of the playhead. Further, the frame that is displayed on the thumbnail 205 is simultaneously displayed on the preview pane 115. As the frames displayed on the thumbnail 205 are updated as the playhead is moved, the frames displayed in the preview pane 115 are also updated.

In addition, the tools pane 125 includes user interface controls 310. In some implementations, the user interface controls 310 are displayed as rectangular shaped buttons arranged adjacent to each other and are horizontally aligned. A user interface control 310 can be configured to perform editing functions including assigning keywords to content. A user can activate a user interface control 310 using the cursor controlled by the pointing device, the keyboard, or both. For example, the cursor may be operated using a pointing device such as a mouse. A user can activate a user interface control 310 by placing the cursor on the control and clicking the mouse. In response, the user interface control 310 may be configured to perform an editing operation which may require user input. Such user input may cause a new interface to be displayed on the display device. The new interface may be positioned over the user interface 100.

Figure 4A:
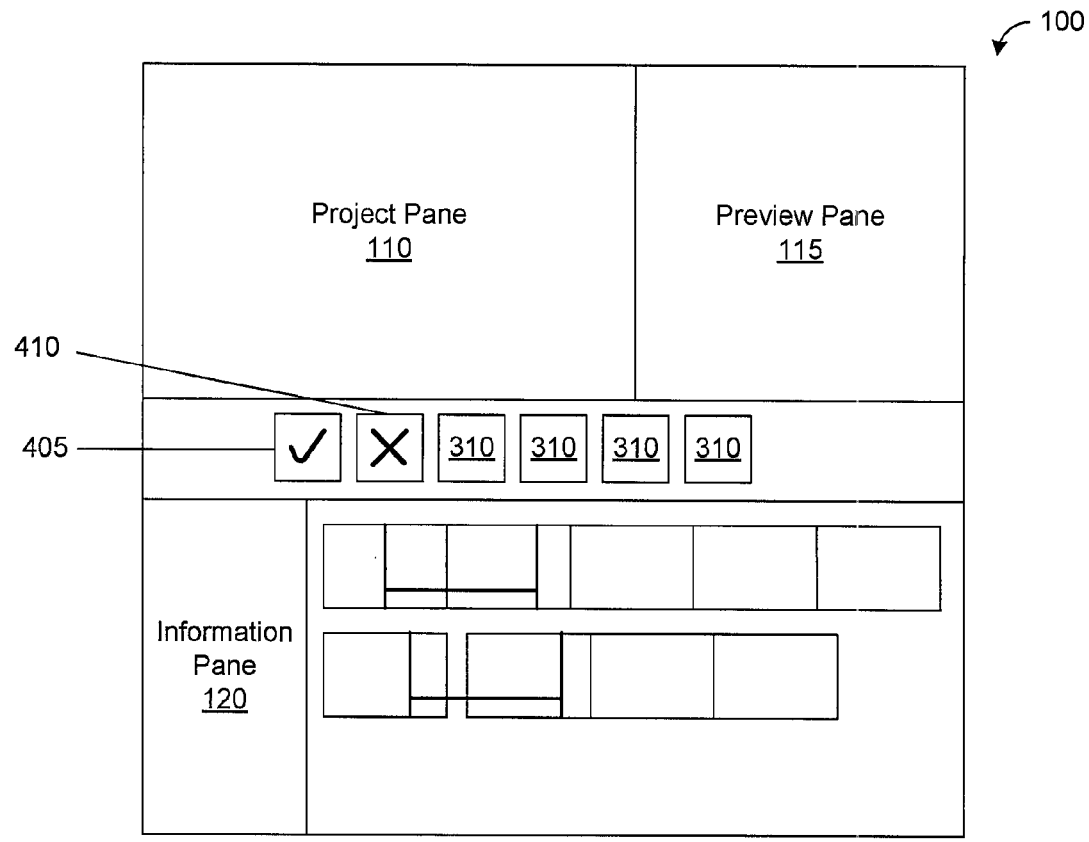
FIG. 4A is an example of a schematic of a user interface displaying tools to assign keywords to video clips.

FIG. 4A depicts an example of a schematic of a user interface 100 displaying user interface controls 310. In this example, a user interface control button can be activated and segments of video clips can be selected to assign keywords. In some implementations, a user can upload video clips for display in the media pane 105. The video clips 200 are displayed as thumbnail groups 210 comprising one or more thumbnails 205. Using the user interface controls 310, a user can group segments of the video clip by assigning keywords to the video clip. The tools pane 125 can include two user interface control buttons, e.g., a "check" button 405 and a "cross" button 410. A user can use the check button 405 or the cross button 410 to present for display or hide from display, respectively, segments of one or more video clips. In some implementations, a user can activate the check button 405 using the cursor. Subsequent to activating the check button 405, the cursor can be positioned on the thumbnail group where the playhead is displayed. A segment of the video clip can be selected by a pointing device configured to operate the playhead. For example, when a mouse is used to operate the playhead, the mouse can be clicked at the first position on the thumbnail group representing the video clip, the mouse can be dragged to a second position representing the same or different video clip, and the mouse can be released. The second position can be located in the same row as the first position or in a different row. In the same row, the first position can be located to the right or to the left of the second position. In this manner, the segment of the video clip between the first and the second position can be selected. The first and second position can be related to the same thumbnail group. Alternatively, the first and second position can be related to different thumbnail groups. The first and second position may be on the same row of thumbnails or on different rows of thumbnails. Alternatively, the playhead can be operated using a different device, e.g., a key board. The playhead can also be operated using, a combination of the key board and the mouse.

In some implementations, the user can select more than one segment from the same or different video clips after activating the check button 405. The check button 405 can be deactivated after selecting segments of video clips. For example, when the cursor is operated by a mouse, a user can activate the check button 405, select a first position, click and drag the mouse to the second position, release the mouse at the second position, deactivate the check button 405. Between activation and deactivation, a user can select one or more segments. In other implementations, the check button 405 can be deactivated once the second position is chosen. For example, a user can activate the check button 405, select a segment of the video clip by clicking and dragging the mouse, and release the mouse at the second position. When the second position is selected, the check button 405 can be automatically deactivated. This can allow a user to resume editing operations without deactivating the check button 405. In some implementations, a user can be presented with modes, wherein a first mode can allow a user to manually activate and deactivate the check button 405 so that a user can select multiple segments of video clips for editing, while a second mode can deactivate a check button 405 after a first selection. A user can choose a mode depending upon the user's editing requirements.

A selected segment of a video clip can be indicated by a line displayed over the segment between the initial and final positions. Each line can be displayed in a different color such that each color represents a keyword. Segments of video clips that are assigned the same keywords can be indicated by lines having the same: color. As the user scrolls the playhead over the thumbnail groups 210 between the first and the second position, an indicator, e.g., a balloon containing text, can be displayed adjacent to the playhead to indicate the keywords assigned to the scanned segments.

The segments of the video clips that are selected using the check button 405 can be filtered for display. In some implementations, the user can hide from display all the segments that have not been selected using the check button 405. In this manner, only the segments selected using the check button 405 can be displayed in the media pane 105. In other implementations, the segments selected using the check button 405 can automatically be transferred to the project pane 110. The remaining segments can be displayed in the media pane 105. In other implementations, the segments selected using the check button 405 can be displayed in the project pane 110. The media pane 105 can display all the video clips.

The operations performed to choose segments of video clips for display can also be performed to hide segments of video clips from display using the cross button 410. For example, a user can activate the cross button 410, select one or more segments of one or more thumbnail groups by selecting a first position, clicking and dragging a mouse to a second position, and releasing the mouse. A line displayed across the selected segment can display an indicator, e.g., a balloon containing text, describing that the selected segment has been chosen to be hidden from display. In this manner, a user can categorize video clips into content for presentation and content for hiding using tools displayed in the tools pane 125. In some implementations, the check button 405 and the cross button 410 can be displayed using a "thumbs up" sign and a "thumbs down" sign to signify content for display and content for hiding, respectively. In some implementations, the check button 405 can be assigned to content that the user determines to be good content, while the cross button 410 can be assigned to content that the user determines to be bad content.

Figure 4B:
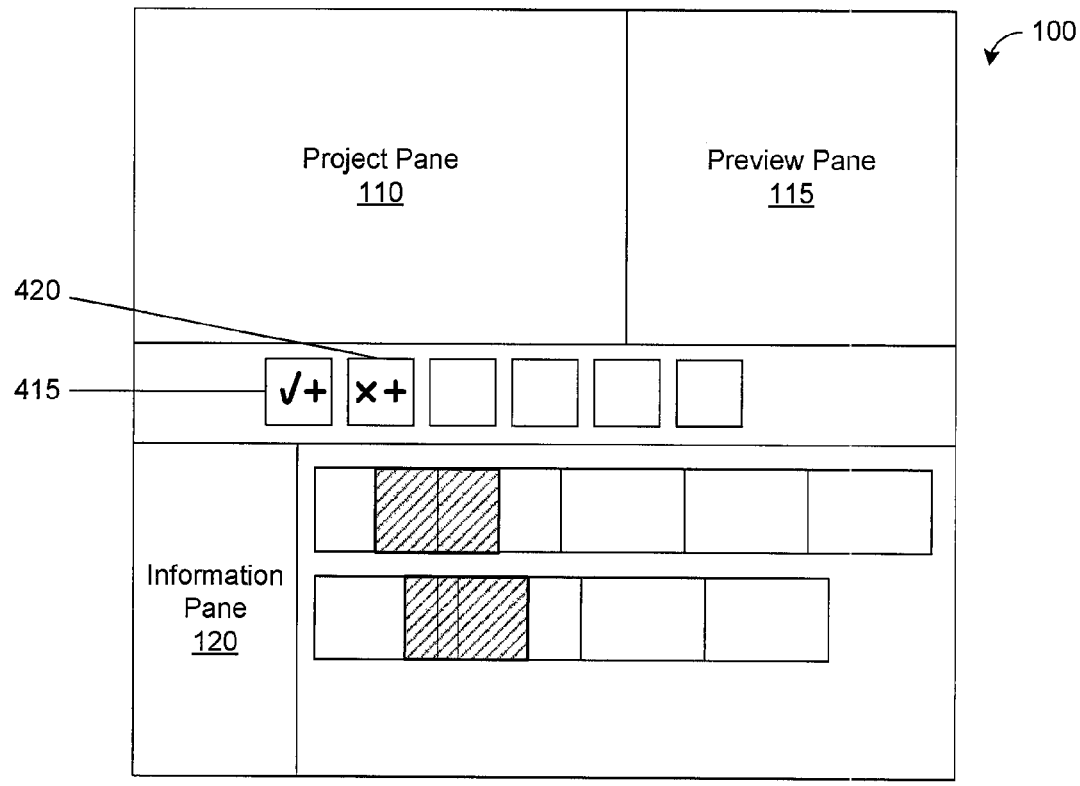
FIG. 4B is an example of a schematic of a user interface displaying tools to assign keywords to video clips.

FIG. 4B depicts an example of a schematic of a user interface 100 displaying user interface control buttons 300. In this example, a user can select segments of video clips and subsequently activate user interface control buttons to assign keywords. In some implementations, a user can select a segment of a video clip. A user can position the playhead at a first position on a thumbnail, select the first position by clicking a pointing device configured to operate the playhead, drag the pointing device to a second position, and release the pointing device. A rectangular region of vertical dimension equal to the vertical dimension of a thumbnail and a horizontal dimension equal to the distance between the first and the second chosen positions can be displayed over the selected segment. In some implementations, the rectangular region can be translucent to permit viewing of the selected segment that is displayed beneath the region.

In some implementations, a user can select segments of video clips before activating the user interface control buttons to assign keywords. When the user selects a segment of a video clip before activating the user interface control, the display of the check button 405 and the cross button 410 can be replaced with the new check button 415 and the new cross button 420. The new check button 415 and the new cross button 420 can include a "+" sign within the bounded region of the user interface control button to indicate that segments of video clips are being or have been selected prior to activating the control button. A user can select one or more segments of video clips using the pointing device, the key board, or both. Subsequent to selecting segments of video clips, the user can activate a user interface control 310. The editing operations which the selected user interface control 310 is configured to perform are performed on the selected segments. In one example, a user can select one or more segments of video clips and activate the new check button 415. In this manner, the selected segments can be chosen to be displayed in the project pane 110. In another example, a user can select one or more segments of video clips and activate the new cross button 420. In this manner, the selected segments can be hidden from display in the media pane 105.

Figure 5:
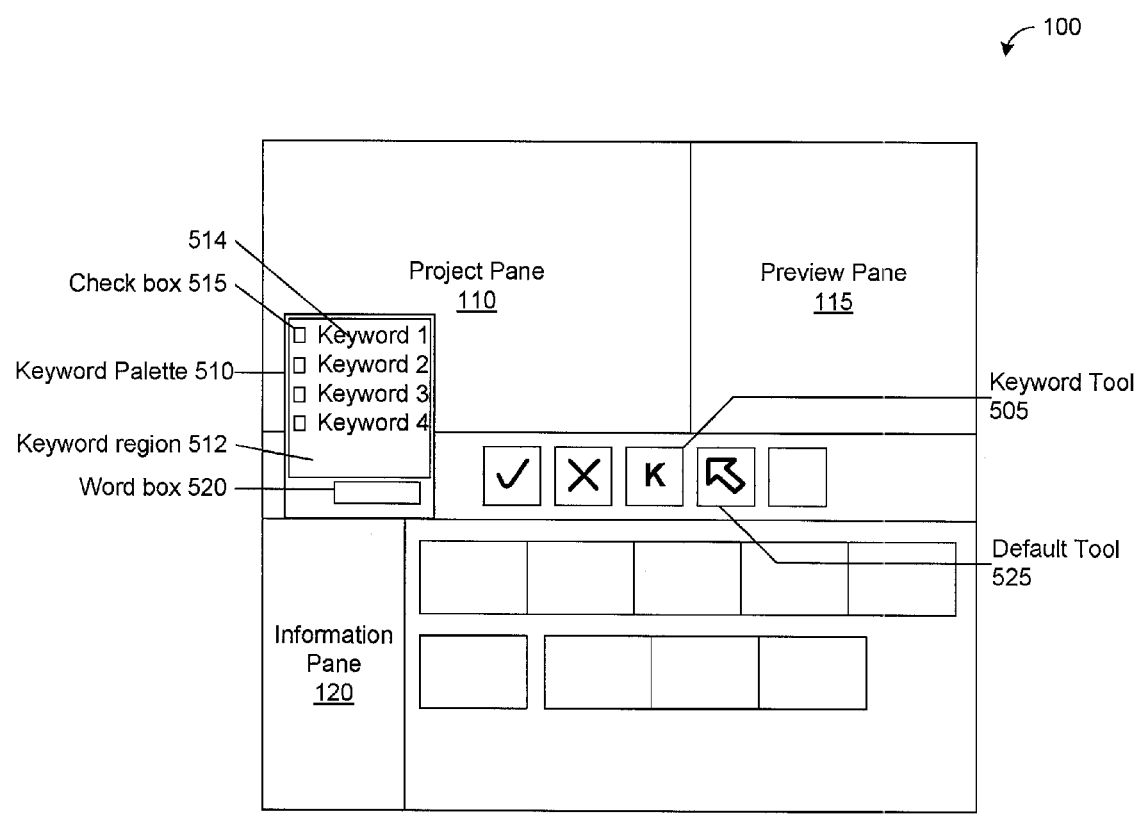
FIG. 5 is an example of a schematic of a user interface displaying tools to assign keywords to video clips.

FIG. 5 depicts an example of a user interface 100 including a keyword tool 505. In some implementations, the tools pane 125 can include a keyword tool 505. The keyword tool 505 can be configured to allow a user to assign keywords to all or segments of the video clip. When a user activates the keyword tool 505, a keyword palette 510 can be displayed on the user interface 100. The dimensions of the keyword palette 510 can be altered based on user input. The keyword palette 510 can include a keyword region 512. The keyword region 512 can include a list of keywords 514 available to be assigned to the video clips. The keyword region 512 can also include check boxes 515 related to the keywords 512. A check box 515 can be positioned adjacent to a keyword 514. In some implementations, a user can activate a keyword 514 by selecting the check box 515 positioned adjacent to the keyword using the cursor.

The keyword palette 510 can include a word box 520. The word box 520 can be used to add keywords to the keyword palette 510. In some implementations, the word box 520 can be displayed adjacent to the bottom horizontal edge of the keyword palette 510. Alternatively, the word box 520 can be displayed adjacent to the top horizontal edge of the keyword palette 510. The sum of the vertical dimension of the keyword region 512 and the vertical dimension of the word box 520 can be less than or equal to the vertical dimension of the keyword palette 510. A user can enter keywords in the word box 520 by positioning the cursor anywhere in the region of the word box 520 and entering text using a suitable device, e.g., a key board. In a default implementation, the keyword region 512 can contain no keywords. Subsequently, the keyword region 512 can include "Good" and "Bad" as keywords assigned to content selected using the check button 405 and the cross button 410, respectively. A user can perform coarse editing operations to the video clips by either activating the check button 405 and the cross button 410 in the tools pane 125 or checking the check boxes 515 adjacent to keywords "Good" and "Bad" in the keyword palette 510. The keyword region 512 can then be populated with keywords added by a user via the word box 520.

The keyword region 512 can have a vertical and a horizontal dimension. A keyword 514 and the related check box 515 can be arranged in a row within the keyword region 512. The first row containing a keyword 514 and a check box 515 can be positioned substantially adjacent to the top left corner of the keyword region 512. A second row containing a keyword 514 and the related check box 515 can be positioned in a second, vertically displaced row within the keyword region 525. A space can be assigned between the first row and the second row. The check boxes 515 of each row can be substantially vertically aligned with each other. In this manner, rows containing keywords 514 and check boxes 515 can be added to the keyword palette 510 and the keywords 514 and the check boxes 515 can be displayed in the keyword region 512.

In some implementations, a decrease in the dimensions of the keyword palette 510 can cause a decrease in the horizontal dimension of the keyword region 525. If the horizontal dimension of the row containing the keyword 514 and the check box 515 is greater than the dimension of the keyword region 514, a horizontal scroll bar (not shown) can be incorporated in the keyword region 512 to allow scrolling to view the keywords. In other implementations, if the horizontal dimension of the keyword region 512 is less than the horizontal dimension of the row containing the keyword 514 and the check box 515, when the user positions the cursor over a row in the keyword region 512, a balloon displaying the entire content of the row may be displayed adjacent to each row. When the user moves the cursor away from the keyword region 512, the balloon may be hidden from display. In this manner, the user can view the contents of each row in the keyword region 512 when the entire content is not displayed.

When a user enters a new keyword 514 in a word box 520, the new keyword 514 can be included to the list of keywords displayed in the keyword region 512. In addition, a check box 515 related to the new keyword 514 can also be displayed adjacent to the new keyword 514. Further, the check box 515 can be activated when the keyword 514 is added to the list. In some implementations, the new keyword 514 can be included as the last keyword in the list of keywords. In other implementations, the new keyword can be included as the first keyword in the list of keywords. If the sum of vertical dimensions of each row of keywords exceeds the vertical dimension of the keyword region 512, a vertical scroll bar can be incorporated in the keyword region 512 to allow scrolling to view the keywords 514 and check boxes 515 that are hidden from display. In this manner, a user can access all the keywords 514 in the keyword palette 510. In addition, when a new keyword 514 is added to the keyword palette 510, the keyword region 512 is rearranged so that the new keyword 514 and the related check box 515 are displayed in the user interface 100.

In some implementations, a user can open the keyword palette 510 by activating the keyword tool 505. The user can choose a keyword 514 displayed in the keyword palette 510 by checking the check box 515 related to the keyword 514. Subsequently, the user can position the cursor at a first position on a thumbnail related to a video clip and select a segment of the video clip starting from the first position to a second position. The chosen keyword 514 can be assigned to the selected segment of the video clip. Alternatively, the user can first select a segment of a video clip. Subsequently, the user can open the keyword palette 510 by activating the keyword tool 505. The user can choose a keyword 514 in the keyword palette 510 by selecting the check box 515 related to the keyword 514. The selected segment can be assigned the chosen keyword 514. In this manner, the user can assign keywords to all or segments of one or more video clips.

The tools pane 125 can include user-configured tools. A user can add a tool to the tools pane 125 for display and configure the tool to perform user-specific editing operations. The tools pane 125 can include a default tool 525. The default tool 525 can be configured to deactivate all other tools in the tools pane 125. For example, a user can perform editing operations including assigning keywords to all or segments of the video clips. Subsequently, the user can activate the default tool 525 to deactivate the keyword assigning operation.

Figure 6:
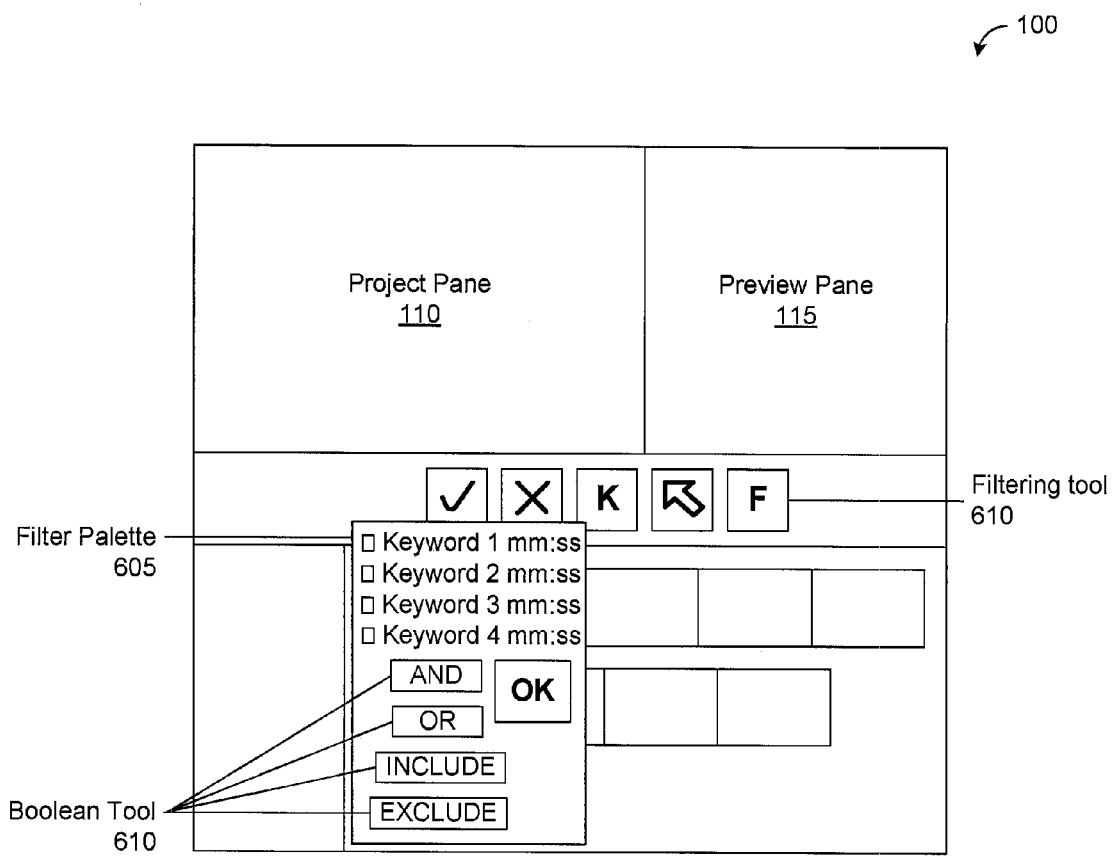
FIG. 6 is an example of a schematic of a user interface displaying tools to filter the display based on keywords.

FIG. 6 depicts an example of a filter palette 605 that a user can use to select content for display based on assigned keywords. In some implementations, a tool on the tools pane 125 can be configured such that a filter palette 605 can be displayed on the user interface 100 when a user activates the filtering tool 610. In some implementations, the filtering tool 610 can be displayed in the tools pane 125. In other implementations, the filtering tool can be displayed anywhere in the user interface 100. The filter palette 605 can include all the keywords assigned to the segments of the video clips. The keywords can include default keywords, e.g., "Good," and "Bad," as well as user-assigned keywords. In addition, the filter palette can also display the time duration for which the keyword is assigned, e.g., in minutes (mm) and seconds (ss).

The filter palette 605 can also include Boolean tools 610 titled, for example, "And," "Or," "Include," and "Exclude." The Boolean tools 610 can be configured such that the content to which keywords have been assigned can be filtered based on the Boolean tool 610 that a user specifies. A segment of content can be assigned more than one keyword. Some segments of the video clip may not be assigned keywords. A user can use the filter palette 605 to display content based on keywords.

In some implementations, a user can activate the filter palette 605. The filter palette 605 can display all the keywords assigned to the video clips. The user can select a keyword by positioning the cursor on the check box adjacent to the keyword. A user can accept this selection by clicking on the "OK" button. All segments of the video content assigned the chosen keyword can be displayed while remaining segments of content assigned no or different keywords can be hidden from display in the media pane 105. In other implementations, all the segments assigned the chosen keyword can be displayed in the project pane 110.

In some implementations, a user can select more than one keyword by choosing more than one check box in the filter palette 605. After selecting more than one keyword, a user can filter the video clips based on Boolean logic. For example, a segment of the video clips can be assigned "Keyword 1" and "Keyword 2." In the filter palette 605, the user can select the check boxes adjacent to "Keyword 1" and "Keyword 2," and select the "And" Boolean tool 610. When the user selects "OK," the segments of video clips that have been assigned both "Keyword 1" and "Keyword 2" are displayed in the media pane 105 while the remainder of the video clips are hidden from display. Alternatively, the segments of video clips that have been assigned both keywords can be displayed in the project pane 110 for further editing. In this manner, a user can display segments of video clips that have been assigned multiple keywords.

In another example, a first segment of the video clips can be assigned "Keyword 1" and a second segment of the video clips can be assigned "Keyword 2." In the filter palette 605, the user can select the check boxes adjacent to "Keyword 1" and "Keyword 2," and select the "Or" Boolean tool 610. When the user selects "OK," the segments of video clips that have been assigned either "Keyword 1" or "Keyword 2" can be displayed in the media pane 105. Alternatively, the segments of video clips that have been assigned either of the keywords can be displayed in the project pane 110 for further editing.

In some implementations, some segments of the video clips may not be assigned a keyword. A segment of the video clips may be assigned "Keyword 1." In the filter palette 605, the user can select the check box adjacent to "Keyword 1," and select the "Include" Boolean tool 610. When the user selects "OK," the segments of the video clips that are not assigned a keyword including the segment of the video clips assigned "Keyword 1" can be displayed in the media pane 105. Alternatively, the segments of video clips that have not been assigned a keyword including the segment of the video clips assigned "Keyword 1" can be displayed in the project pane 110 for further editing.

In some implementations, a segment of the video clips may be assigned "Keyword 1." In the filter palette 605, the user can select the check box adjacent to "Keyword 1," and select the "Exclude" Boolean tool 610. All segments of video clips excluding the segment of video clips assigned "Keyword 1" can be displayed in the media pane 105. Alternatively, all segments of video clips excluding the segment assigned "Keyword 1" can be displayed in the project pane 110 for further editing. In this manner, the user can assign keywords to the video clips displayed in the media pane 105 and, subsequently, either filter the content displayed in the media pane 105 or transfer the keyword assigned content to the project pane 110 for further editing.

Figure 7:
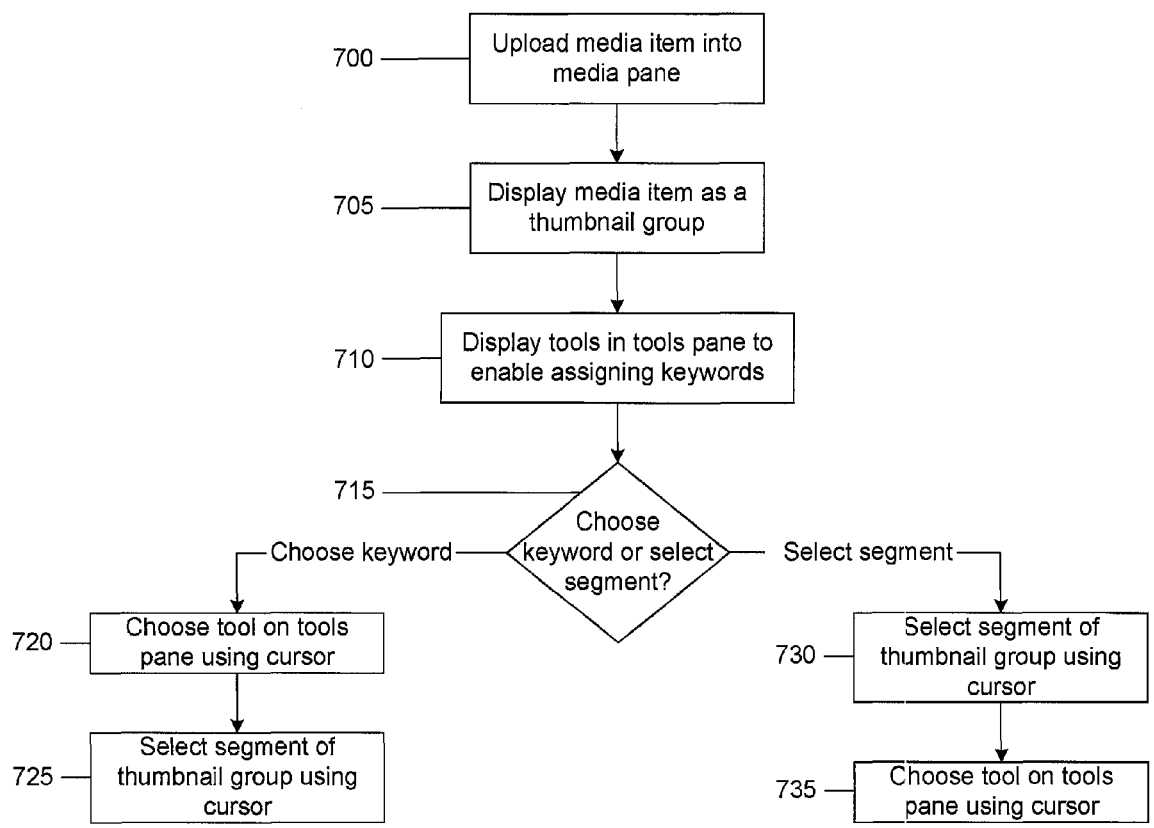
FIG. 7 is a flowchart of an example of assigning a keyword to segments of video clips.

FIG. 7 is a flowchart depicting an example of assigning a keyword to segments of video clips. The media item can be uploaded into a media pane on a user interface at 700. The media item can include a video clip or a photograph. The media item can be displayed as a thumbnail group at 705 where a thumbnail group can include one or more thumbnails. The thumbnail group can represent the media item. Tools that enable assigning keywords can be displayed in a tools pane at 710. In some implementations, the tools in a tools pane can be configured to assign keywords to segments of the thumbnail group. As a first step, a user can choose a keyword or select a segment (715). A user can choose a tool on the tools pane using the cursor at 720. Subsequently, the user can select one or more segments of the thumbnail group using the cursor at 725. In this manner, a user can first choose keywords and then select segments to which the keywords are assigned. Alternatively, a user can first select one or more segments of the video clip using the cursor at 730. Subsequently, the user can choose a keyword using the tools on the tools pane to assign to the selected segments at 735.

Figure 8:
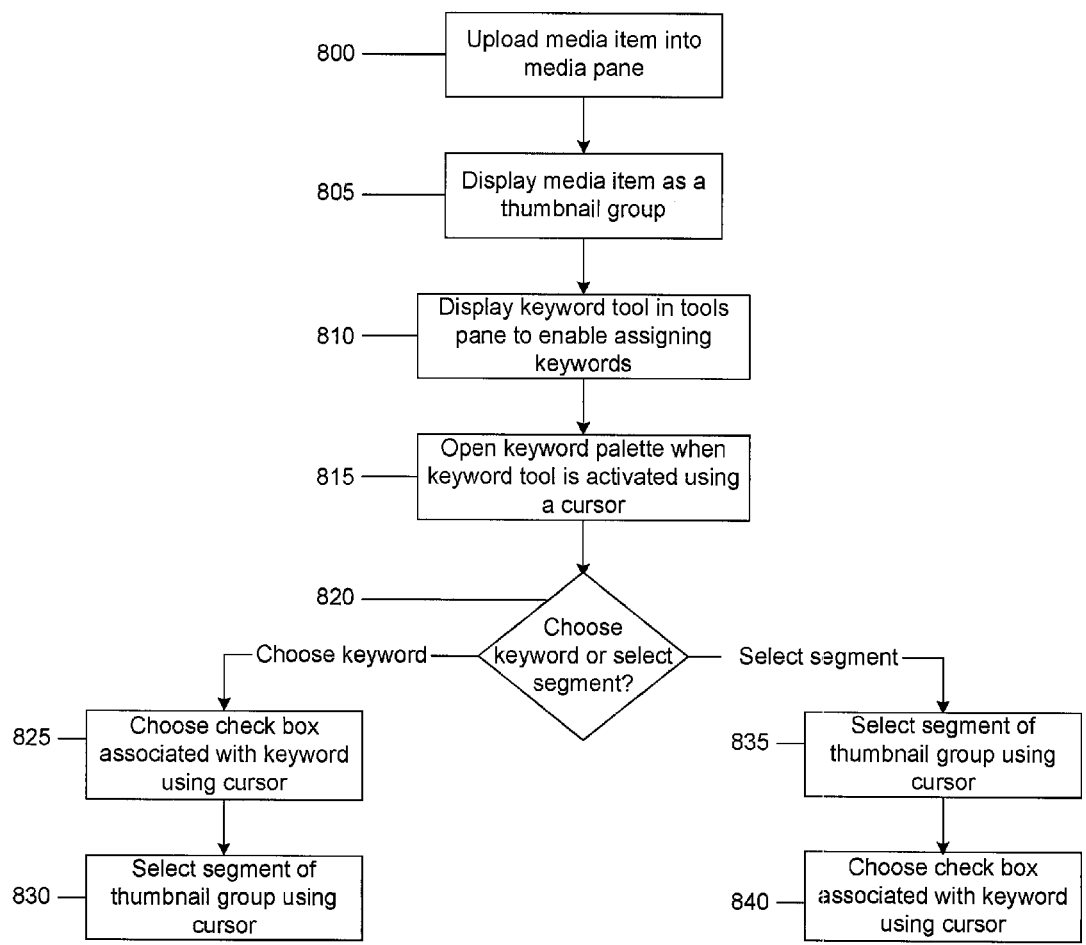
FIG. 8 is a flowchart of an example of assigning a keyword in a keyword palette to segments of video clips.

FIG. 8 depicts a flowchart of an example of assigning a keyword in a keyword palette to segments of video clips. In some implementations, several keywords can be available to be assigned to one or more segments in thumbnail groups. The keywords can be displayed in a keyword palette. The keyword palette can be displayed by activating a tool in the tools pane. The media item can be uploaded into a media pane on a user interface at 800. The media item can include a video clip or a photograph. The media item can be displayed as a thumbnail group at 805 where a thumbnail group can include one or more thumbnails. The thumbnail group can represent the media item. A keyword tool configured to display the keyword palette upon activation can be displayed in the tools pane at 810. A user can activate the keyword tool to display the keyword palette at 815. As a first step, a user can choose a keyword or select a segment (820). A user can choose a keyword in the keyword palette by choosing the check box associated with the keyword using the cursor at 825. Subsequently, the user can select one or more segments of the thumbnail group using the cursor at 830. In this manner, a user can first choose keywords and then select segments to which the keywords are assigned. Alternatively, a user can first select one or more segments of the video clip using the cursor at 835. Subsequently, the user can choose a keyword by choosing a check box associated with the keywords in the keyword palette.

Figure 9:
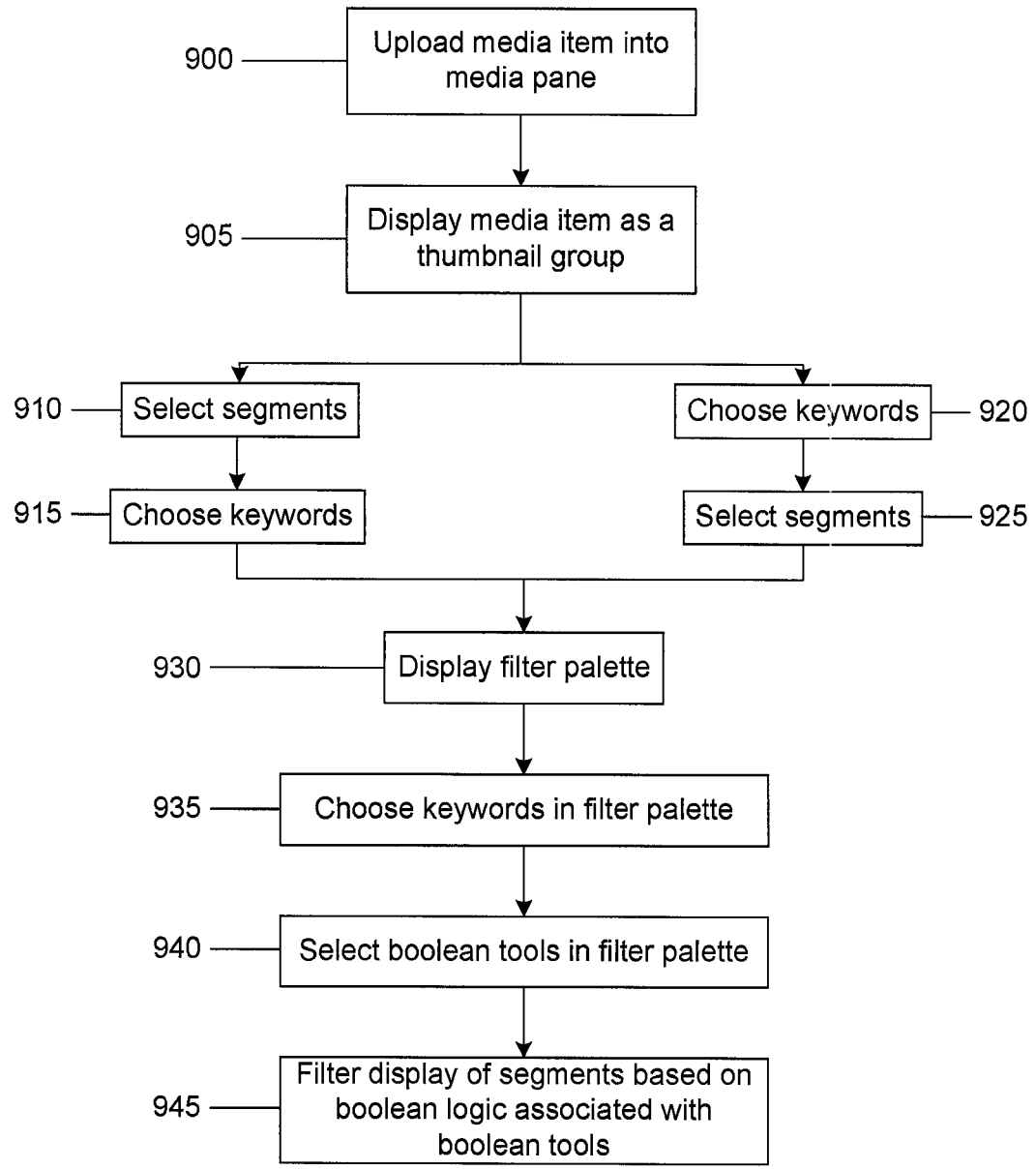
FIG. 9 is a flowchart of an example of filtering the display of segments of video clips based on keywords.

FIG. 9 depicts a flowchart of an example of filtering the display of segments of video clips based on keywords. In some implementations, the display of the segments can be filtered based on keywords assigned to the segments. The media item can be uploaded into a media pane on a user interface at 900. The media item can include a video clip or a photograph. The media item can be displayed as a thumbnail group at 905 where a thumbnail group can include one or more thumbnails. The thumbnail group can represent the media item. A user can select segments (910) and choose keywords (915) to assign to the segments. Alternatively, a user can choose keywords (920) and select segments (925) to which the keywords can be assigned. The filter palette can be displayed 930 by activating a tool on the user interface. In some implementations, the tool to display the filter palette can be positioned in the tools pane. The filter palette can contain all the keywords that have been assigned to the one or more segments in the thumbnail groups and the duration of the segment for which a keyword is assigned. A user can choose one or more keywords in the filter palette at 935. A user can select Boolean tools in the filter palette at 940. The Boolean tools can be selected by positioning the cursor over the user interface control buttons representing a Boolean tool (e.g., "AND," "OR," "INCLUDE," and "EXCLUDE) and selecting the Boolean tool. Each Boolean tool can be configured to perform an editing operation based on Boolean logic. The display of the segments in the thumbnail group can be filtered for display based on the Boolean tool chosen at 945. For example, if a user chooses "Keyword 1," "Keyword 2," and "AND," only the segments assigned both "Keyword 1" and "Keyword 2" can be displayed while the remainder of the segments can be hidden from display. Alternatively, the filtered segments can be transferred to the project pane for further editing.

Figure 10:
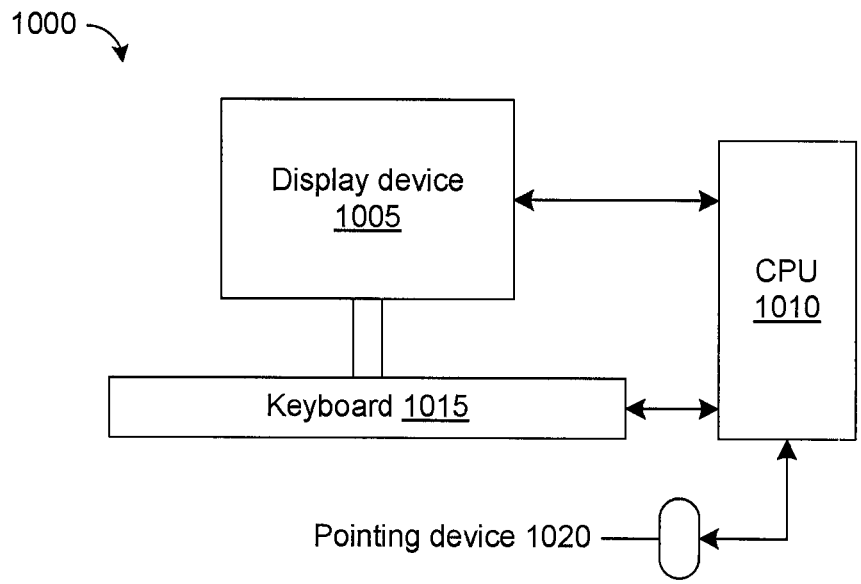
FIG. 10 is an example of a schematic of a system on which the video editing software is implemented.

FIG. 10 depicts an example of a schematic of a system in which the video editing software is implemented. The system 1000 includes a display device 1005, a central processing unit (CPU) 1010, a key board 1015, and a pointing device 1020. The software can be implemented in virtually any suitable system 1000 (e.g., desktop computer, laptop computer, personal digital assistant (PDA), smartphone, work station). Information can be displayed to a user using any suitable display device 1005 including a cathode ray tube (CRT) and liquid crystal display (LCD) monitor. A user can use a key board 1015 and virtually any suitable pointing device 1020 (e.g., mouse, track ball, stylus, touch screen) to interact with the video editing software. In addition, a user can also use a near-contact screen to interact with the video editing software. For example, the user interface 100 can include a proximity detection mechanism that can detect the presence of an input device, such a user's finger, without requiring contact with the surface on which the user interface 100 is displayed. The display device 1005, the key board 1015, and the pointing device 1020 can be operatively coupled with the CPU 1010 through wired or wireless means.

In some implementations, the software can be installed on a CPU 1010 controlled by an operating system such as Macintosh Operating System (Mac OS) X v10.0. In other implementations, the software can be installed on a CPU 1110 controlled by other operating systems including Microsoft Windows, UNIX, and Linux. In some implementations, the system 1000 is a stand alone device such as a desktop computer. In other implementations, the system 1000 is a network where the software is installed in a centralized server and a user can access the software through one or more nodes such as work stations.

Figure 11:
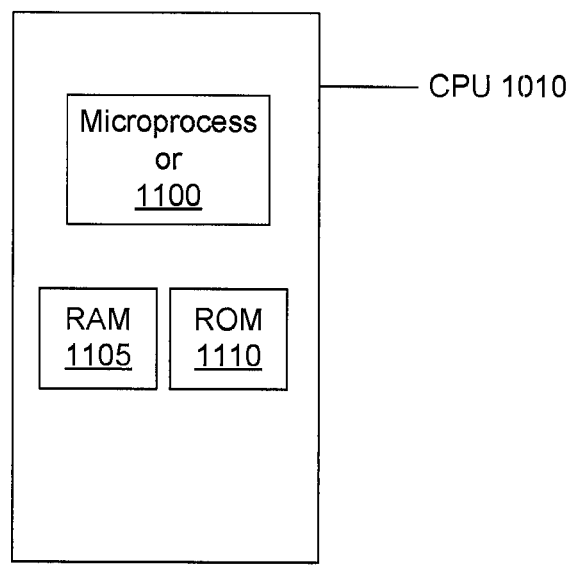
FIG. 11 is an example of a schematic of a central processing unit.

FIG. 11 depicts an example of a schematic of a central processing unit 1010. The CPU 1010 includes a microprocessor 1100, a random access memory (RAM) 1105, and a read only memory (ROM) 1110. When a user runs the video editing software application installed on a system 1000, the user provides instructions to the CPU 1010 using one or more of the input devices including the keyboard 1015 and the pointing device 1020. The microprocessor 1000 performs the operations specified by the user based on user input and instructions from RAM 1105 or ROM 1110 or both. The system 1000 displays the output on the display device 1005. In addition, the CPU 1010 can include a storage device to store content including raw footage recorded using the recording instrument, edited video, and additional content. In some implementations, the storage device resides in the CPU 1010. In other implementations, the storage devices resides external to the CPU 1010. In other implementations, the storage device resides in the recording instrument. The recording instrument is operatively coupled to the CPU 1010 through wired or wireless means to retrieve stored content.

Although a few implementations have been described here, other modifications are possible. For example, the video editing software can be embedded into the recording instrument. The display device on which the recorded content is played back can be used to display the user interface 100 including the media pane 105, the project pane 110, and the preview pane 115. A user can use a pointing device 1120 including a stylus and a touch screen to scrub across thumbnails in the media pane 105, select segments of video from the thumbnails in the media pane and 105 and transfer the selected segments to the project pane 110. Preview of the content in the thumbnail groups 210 displayed in the media pane 105 or the segments of video content in the project pane 110 or both can be viewed in the preview pane 115.

In some implementations, more than one user interface 100 can be opened and viewed simultaneously. For example, video clips 200 in a first video library can be uploaded into a first media pane 105 in a first user interface 100. Video clips in a second video library can be uploaded into a second media pane 105 in a second user interface 100. The same keyword can be assigned to segments of video clips 200 in the first video library as well as segments of video clips 200 in the second library. For example, a user can activate the check button 405, select segments of video clips in the first video library, switch the display to the second user interface, select segments of video clips in the second video library, and deactivate the check button 405.

When keywords are assigned to segments of video clips and the video clips are filtered based on the assigned keywords, the display of video clips in the media pane 105 may remain unaltered. The filtered segments of the video clips may be displayed in the project pane 110. Subsequently, the segments of the video clips can be saved as a project. In some implementations, the keywords assigned to the segments can also be saved in the project. Thus, when a user accesses a saved project, the keywords that were assigned to the segments of the project can be determined. Alternatively, subsequent to filtering, the keywords can be dissociated from the segments of video clips. If the segments of video clips are stored as a project, the video clip can be keyword free. In other implementations, when keyword assigned segments of video clips are stored, the user may be prompted to store the keywords with related segments.

Keywords can be assigned to video clips displayed in any pane on the user interface 100. For example, a user can transfer segments of video clips from the media pane 105 to the project pane 110. Subsequently, the user can open the keyword palette 510 and assign keywords to segments of video clips displayed in both the media pane 105 and the project pane 110. Similarly, filters can be applied to segments of video clips displayed in both the media pane 105 and the project pane 110.

In some implementations, two or more segments belonging to the same video content can be assigned the same keyword. In addition, segments belonging to different video clips can be assigned the same keyword. When the video clip display is filtered to display segments that are assigned the same keyword, segments belonging to the same video clip can be displayed as a continuous sequence of thumbnails, while segments belonging to different video clips can be displayed as separated by a distance. Such display can occur either in the media pane 105 or in the project pane 110 based on user input. Alternatively, all segments assigned the same keyword can be displayed continuously regardless of the video clip to which the segment belongs.

In some implementations, when the display of video clips is filtered based on more than one keyword, segments of video clips can be arranged based on the video clip to which the segments belong. For example, a first segment of a first video clip can be assigned "Keyword 1," a second segment of the first video clip can be assigned "Keyword 2," and a first segment of a second video clip can be assigned "Keyword 1." If the video clips are filtered to display segments of video clips assigned "Keyword 1" or "Keyword 2," the first and second segments of the first video clip can be displayed as a continuous sequence. The first segment of the second video clip can be displayed adjacent to the sequence. In an alternate implementation, segments of video clips assigned the same keyword can be displayed continuously. Thus, in the above example, the first segments of the first and second video clip can be displayed as a continuous sequence, while the second segment of the first video clip can be displayed adjacent to the sequence. In this manner, segments of video clips that are filtered based on assigned keywords can be arranged either based on keywords or based on the video clip to which the segments belong.

In some implementations, the system can compare the content (video and/or audio) of frames to identify regions of similar content. For example, the system can identify segments of video content where the backgrounds have the same color. The system can assign the color as a keyword to the identified segments. In another example, the system can identify segments of audio content where the volume is loud. The system can assign "Loud" as a keyword to the identified segments. The keyword assigned to segments identified by the system can be displayed in the keyword palette during editing. The keyword assigned to the segments can be altered based on user input. Segments of video can be added to or removed from the segments identified by the system.

The editing software can be used to edit photographs. Photographs can be uploaded into a user interface from a storage device, e.g., the camera used to capture the photographs. Each photograph can be displayed as a thumbnail. In addition, an album containing one or more photographs can also be displayed as thumbnails. A user can categorize photographs into, for example, good photographs and bad photographs using the check button 405 and the cross button 410, respectively. The system can compare contents of photographs and assign keywords to content. A keyword palette can be displayed to add keywords. A filter palette can be used to filter the display of photographs based on assigned keywords. In this manner, new albums can be created from uploaded photographs. Similarly, the editing software can be used to edit music files such as mp3 files, wav files, and the like. Accordingly, other embodiments are within the scope of the following claims.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. A computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices).

What is claimed is:

1. A computer-implemented method comprising:
   displaying, within a user interface in a digital media system, a media pane;
   displaying, within the media pane, a plurality of thumbnails that collectively represent a media item, wherein each thumbnail corresponds to a section of media item content that is less than all of the media item content;
   detecting inputs selecting a first portion of a first thumbnail and a second portion of a second thumbnail, wherein at least the first portion of the first thumbnail or the second portion of the second thumbnail is respectively less than all of the first thumbnail or the second thumbnail; and
   determining media item content associated with all thumbnails between the first portion of the first thumbnail and the second portion of the second thumbnail as a first segment of the media item, wherein the first segment includes media item content corresponding to the first portion of the first thumbnail and media item content corresponding to the second portion of the second thumbnail.

2. The method of claim 1, wherein one or more media items are displayed within the media pane, the one or more media items including one or more of digital or digitized video clips and photographs.

3. The method of claim 1, wherein detecting inputs selecting the first portion of the first thumbnail and the second portion of the second thumbnail comprises:
   detecting a first selection of a starting position within the first thumbnail using a pointer;
   in response to detecting the first selection, displaying a first vertical line on the first thumbnail at the starting position that is indicative of the first selection;
   selecting a section of the first thumbnail from the first vertical line to an end of the first thumbnail as the first portion;
   detecting a second selection of an ending position within the second thumbnail using the pointer;
   in response to detecting the second selection, displaying a second vertical line on the second thumbnail at the ending position that is indicative of the second selection; and
   selecting a section of the second thumbnail from a start of the second thumbnail to the second vertical line as the second portion.

4. The method of claim 3, wherein the starting position corresponds to a first frame of the media item content associated with a time instant determined by the starting position and the ending position corresponds to a second frame of the media item content associated with a time instant determined by the ending position, the method comprising:
   in response to detecting the first selection, displaying, in a preview pane included in the user interface, the first frame;
   in response to detecting the second selection, displaying, in the preview pane, the second frame; and
   selecting, as the first segment, a continuous portion of the media item content between the first frame and the second frame.

5. The method of claim 3, wherein the ending position is independent of the starting position.

6. The method of claim 3, wherein a length of the first vertical line or the second vertical line is equal to a vertical dimension of the respective first thumbnail or the second thumbnail.

7. The method of claim 1, further comprising:
   displaying, within the user interface, a tools pane that includes a tool configured to enable a user to assign a keyword to one or more segments of the media item;
   detecting input to activate the tool to assign a first keyword to the first segment;
   in response to detecting the input to activate the tool, displaying a keyword tool in the user interface; and
   displaying a keyword palette within the keyword tool, wherein the keyword palette includes a keyword region displaying the first keyword and a first check box associated with the first keyword.

8. The method of claim 7, further comprising assigning the first keyword to the first segment, wherein assigning the first keyword to the first segment comprises:
   receiving an input selecting the first check box associated with the first keyword; and
   in response to receiving the input selecting the first check box, assigning the first keyword to the first segment.

9. The method of claim 7, wherein the keyword region includes a second keyword and a second check box associated with the second keyword, the method comprising:
   assigning the second keyword to a second segment of the media item.

10. The method of claim 9, wherein assigning the second keyword to the second segment comprises:
    detecting inputs selecting a new first portion of a new first thumbnail and a new second portion of a new second thumbnail;
    determining media item content associated with all thumbnails between the new first portion and the new second portion as the second segment;
    after determining the second segment, detecting input to select the second check box associated with the second keyword to assign the second keyword to the second segment; and
    assigning the second keyword to the second segment.

11. The method of claim 9, wherein assigning the second keyword to the second segment comprises:
    detecting input to select the second check box associated with the second keyword;
    after detecting the input to select the second check box, detecting inputs selecting a new first portion of a new first thumbnail and a new second portion of a new second thumbnail;
    determining media item content associated with all thumbnails between the new first portion and the new second portion as the second segment; and
    assigning the second keyword to the second segment.

12. The method of claim 7, comprising:
    displaying, within the keyword palette, a word box that is configured as an input field to receive keywords from a user for inclusion in the keyword palette.

13. The method of claim 12, comprising:
    receiving, through the word box, a user input providing a third keyword; and in response to receiving the user input providing the third keyword, displaying, in the keyword region, the third keyword and an associated third check box that is displayed adjacent to the third keyword.

14. The method of claim 1, comprising:
detecting inputs selecting a new first portion of a new first thumbnail and a new second portion of a new second thumbnail; and
determining media item content associated with all thumbnails between the new first portion and the new second portion as a second segment of the media item, wherein the second segment includes media item content corresponding the new first portion of the new first thumbnail and media item content corresponding to the new second portion of the new second thumbnail.

15. The method of claim 14, further comprising:
displaying, within the user interface, a tools pane that includes a tool configured to enable a user to assign a keyword to one or more segments of the media item;
detecting input to activate the tool to assign a first keyword to the first segment and the second segment; and
in response to detecting the input to activate the tool, assigning the first keyword to the first segment and the second segment.

16. The method of claim 15, comprising:
displaying, within the user interface, a filter tool;
detecting input to filter the display of the first segment and the second segment based on the assigned first keyword; and
in response to detecting the input to filter the display:
removing, from the user interface, thumbnails that are not included in the first segment or the second segment, and
displaying, in the user interface, the first segment and the second segment.

17. The method of claim 16, wherein detecting input to filter the display comprises:
detecting input to activate the filter tool; and
in response to detecting input to activate the filter tool, displaying, in the user interface, a filter palette, the filter palette comprising:
a plurality of keywords assigned to a plurality of segments of the media item that comprise subsets of the plurality of thumbnails displayed in the media pane; and
a check box associated with each keyword.

18. The method of claim 17, wherein displaying the filter palette comprises:
displaying, in association with each keyword included in the filter palette, a time duration for which the associated keyword is assigned to the plurality of segments.

19. The method of claim 17, wherein displaying the filter palette comprises:
displaying, in the filter palette, a Boolean tool that is selectable by a user, wherein the Boolean tool includes a user-selectable icon indicating Boolean AND, the user-selectable icon is associated with performing Boolean AND operation.

20. The method of claim 17, wherein displaying the filter palette comprises:
displaying, in the filter palette, a Boolean tool that is selectable by a user, wherein the Boolean tool includes a user-selectable icon indicating Boolean OR, the user-selectable icon is associated with performing Boolean OR operation.

21. A medium bearing instructions to enable one or more machines to perform operations comprising:
displaying, within a user interface in a digital media system, a media pane;
displaying, within the media pane, a plurality of thumbnails that collectively represent a media item, wherein each thumbnail corresponds to a section of media item content that is less than all of the media item content;
detecting inputs selecting a first portion of a first thumbnail and a second portion of a second thumbnail, wherein at least the first portion of the first thumbnail or the second portion of the second thumbnail is respectively less than all of the first thumbnail or the second thumbnail; and
determining media item content associated with all thumbnails between the first portion of the first thumbnail and the second portion of the second thumbnail as a first segment of the media item, wherein the first segment includes media item content corresponding the first portion of the first thumbnail and media item content corresponding to the second portion of the second thumbnail.

22. The medium of claim 21, wherein one or more media items are displayed within the media pane, the one or more media items including one or more of digital or digitized video clips and photographs.

23. The medium of claim 21, wherein detecting inputs selecting the first portion of the first thumbnail and the second portion of the second thumbnail comprises:
detecting a first selection of a starting position within the first thumbnail using a pointer;
in response to detecting the first selection, displaying a first vertical line on the first thumbnail at the starting position that is indicative of the first selection;
selecting a section of the first thumbnail from the first vertical line to an end of the first thumbnail as the first portion;
detecting a second selection of an ending position within the second thumbnail using the pointer;
in response to detecting the second selection, displaying a second vertical line on the second thumbnail at the ending position that is indicative of the second selection; and selecting a section of the second thumbnail from a start of the second thumbnail to the second vertical line as the second portion.

24. The medium of claim 23, wherein the starting position corresponds to a first frame of the media item content associated with a time instant determined by the starting position and the ending position corresponds to a second frame of the media item content associated with a time instant determined by the ending position, the operations comprising:
in response to detecting the first selection, displaying, in a preview pane included in the user interface, the first frame;
in response to detecting the second selection, displaying, in the preview pane, the second frame; and
selecting, as the first segment, a continuous portion of the media item content between the first frame and the second frame.

25. The medium of claim 23, wherein the ending position is independent of the starting position.

26. The medium of claim 23, wherein a length of the first vertical line or the second vertical line is equal to a vertical dimension of the respective first thumbnail or the second thumbnail.

27. The medium of claim 21, wherein the instructions enable the one or more machines to perform operations comprising:

displaying, within the user interface, a tools pane that
includes a tool configured to enable a user to assign a
keyword to one or more segments of the media item;
detecting input to activate the tool to assign a first keyword
to the first segment;
in response to detecting the input to activate the tool, displaying a keyword tool in the user interface; and
in response to input to activate the tool, displaying a keyword palette within the keyword tool, wherein the keyword palette includes a keyword region displaying the first keyword and a first check box associated with the first keyword.

28. The medium of claim 27, further comprising instructions that enable the one or more machines to assign the first keyword to the first segment, wherein assigning the first keyword to the first segment comprises:
receiving an input selecting the first check box associated with the first keyword; and
in response to receiving the input selecting the first check box, assigning the first keyword to the first segment.

29. The medium of claim 27, wherein the keyword region includes a second keyword and a second check box associated with the second keyword, the operations comprising:
assigning the second keyword to a second segment of the media item.

30. The medium of claim 29, wherein assigning the second keyword to the second segment comprises:
detecting inputs selecting a new first portion of a new first thumbnail and a new second portion of a new second thumbnail;
determining media item content associated with all thumbnails between the new first portion and the new second portion as the second segment;
after determining the second segment, detecting input to select the second check box associated with the second keyword to assign the second keyword to the second segment; and
assigning the second keyword to the second segment.

31. The medium of claim 29, wherein assigning the second keyword to the second segment comprises:
detecting input to select the second check box associated with the second keyword;
after detecting the input to select the second check box, detecting inputs selecting a new first portion of a new first thumbnail and a new second portion of a new second thumbnail;
determining media item content associated with all thumbnails between the new first portion and the new second portion as the second segment; and
assigning the second keyword to the second segment.

32. The medium of claim 27, wherein the instructions enable the one or more machines to perform operations comprising:
displaying, within the keyword palette, a word box that is configured as an input field to receive keywords from a user for inclusion in the keyword palette.

33. The medium of claim 32, the operations comprising:
receiving, through the word box, a user input providing a third keyword; and
in response to receiving the user input providing the third keyword, displaying, in the keyword region, the third keyword and an associated third check box that is displayed adjacent to the third keyword.

34. The medium of claim 21, the operations comprising:
detecting inputs selecting a new first portion of a new first thumbnail and a new second portion of a new second thumbnail; and
determining media item content associated with all thumbnails between the new first portion and the new second portion as a second segment of the media item, wherein the second segment includes media item content corresponding the new first portion of the new first thumbnail and media item content corresponding to the new second portion of the new second thumbnail.

35. The medium of claim 34, the operations comprising:
displaying, within the user interface, a tools pane that includes a tool configured to enable a user to assign a keyword to one or more segments of the media item;
detecting input to activate the tool to assign a first keyword to the first segment and the second segment; and
in response to detecting the input to activate the tool, assigning the first keyword to the first segment and the second segment.

36. The medium of claim 35, the operations comprising:
displaying, within the user interface, a filter tool;
detecting input to filter the display of the first segment and the second segment based on the assigned first keyword; and in response to detecting the input to filter the display:
removing, from the user interface, thumbnails that are not included in the first segment or the second segment, and
displaying, in the user interface, the first segment and the second segment.

37. The medium of claim 36, wherein detecting input to filter the display comprises:
detecting input to activate the filter tool; and
in response to detecting input to activate the filter tool, displaying, in the user interface, a filter palette, the filter palette comprising:
a plurality of keywords assigned to a plurality of segments of the media item that comprise subsets of the plurality of thumbnails displayed in the media pane; and
a check box associated with each keyword.

38. The medium of claim 37, wherein displaying the filter palette comprises:
displaying, in association with each keyword included in the filter palette, a time duration for which the associated keyword is assigned to the plurality of segments.

39. The medium of claim 37, wherein displaying the filter palette comprises:
displaying, in the filter palette, a Boolean tool that is selectable by a user, wherein the Boolean tool includes a user-selectable icon indicating Boolean AND, the user-selectable icon is associated with performing Boolean AND operation.

40. The medium of claim 37, wherein displaying the filter palette comprises:
displaying, in the filter palette, a Boolean tool that is selectable by a user, wherein the Boolean tool includes a user-selectable icon indicating Boolean OR, the user-selectable icon is associated with performing Boolean OR operation.

41. A system comprising:
instructions stored in a machine-readable medium for execution by a processor and, when executed, configured to cause the processor to perform operations comprising:
displaying, within a user interface in a digital media system, a media pane;
displaying, within the media pane, a plurality of thumbnails that collectively represent a media item, wherein each thumbnail corresponds to a section of media item content that is less than all of the media item content;

detecting inputs selecting a first portion of a first thumbnail and a second portion of a second thumbnail, wherein at least the first portion of the first thumbnail or the second portion of the second thumbnail is respectively less than all of the first thumbnail or the second thumbnail; and determining media item content associated with all thumbnails between the first portion of the first thumbnail and the second portion of the second thumbnail as a first segment of the media item, wherein the first segment includes media item content corresponding the first portion of the first thumbnail and media item content corresponding to the second portion of the second thumbnail.

42. The system of claim 41, wherein one or more media items are displayed within the media pane, the one or more media items including one or more of digital or digitized video clips and photographs.

43. The system of claim 41, wherein detecting inputs selecting the first portion of the first thumbnail and the second portion of the second thumbnail comprises:

detecting a first selection of a starting position within the first thumbnail using a pointer;

in response to detecting the first selection, displaying a first vertical line on the first thumbnail at the starting position that is indicative of the first selection;

selecting a section of the first thumbnail from the first vertical line to an end of the first thumbnail as the first portion;

detecting a second selection of an ending position within the second thumbnail using the pointer;

in response to detecting the second selection, displaying a second vertical line on the second thumbnail at the ending position that is indicative of the second selection; and selecting a section of the second thumbnail from a start of the second thumbnail to the second vertical line as the second portion.

44. The system of claim 43, wherein the starting position corresponds to a first frame of the media item content associated with a time instant determined by the starting position and the ending position corresponds to a second frame of the media item content associated with a time instant determined by the ending position, the operations comprising:

in response to detecting the first selection, displaying, in a preview pane included in the user interface, the first frame;

in response to detecting the second selection, displaying, in the preview pane, the second frame; and selecting, as the first segment, a continuous portion of the media item content between the first frame and the second frame.

45. The system of claim 43, wherein the ending position is independent of the starting position.

46. The system of claim 43, wherein a length of the first vertical line or the second vertical line is equal to a vertical dimension of the respective first thumbnail or the second thumbnail.

47. The system of claim 41, wherein the instructions cause the processor to perform operations comprising:

displaying, within the user interface, a tools pane that includes a tool configured to enable a user to assign a keyword to one or more segments of the media item;

detecting input to activate the tool to assign a first keyword to the first segment;

in response to detecting the input to activate the tool, displaying a keyword tool in the user interface; and in response to input to activate the tool, displaying a keyword palette within the keyword tool, wherein the keyword palette includes a keyword region displaying the first keyword and a first check box associated with the first keyword.

48. The system of claim 47, further comprising assigning the first keyword to the first segment, wherein assigning the first keyword to the first segment comprises:

receiving an input selecting the first check box associated with the first keyword; and in response to receiving the input selecting the first check box, assigning the first keyword to the first segment.

49. The system of claim 47, wherein the keyword region includes a second keyword and a second check box associated with the second keyword, the operations comprising:

assigning the second keyword to a second segment of the media item.

50. The system of claim 49, wherein assigning the second keyword to the second segment comprises:

detecting inputs selecting a new first portion of a new first thumbnail and a new second portion of a new second thumbnail;

determining media item content associated with all thumbnails between the new first portion and the new second portion as the second segment;

after determining the second segment, detecting input to select the second check box associated with the second keyword to assign the second keyword to the second segment; and assigning the second keyword to the second segment.

51. The system of claim 49, wherein assigning the second keyword to the second segment comprises:

detecting input to select the second check box associated with the second keyword;

after detecting the input to select the second check box, detecting inputs selecting a new first portion of a new first thumbnail and a new second portion of a new second thumbnail;

determining media item content associated with all thumbnails between the new first portion and the new second portion as the second segment; and assigning the second keyword to the second segment.

52. The medium of claim 47, wherein the instructions cause the processor to perform operations comprising:

displaying, within the keyword palette, a word box that is configured as an input field to receive keywords from a user for inclusion in the keyword palette.

53. The system of claim 52, the operations comprising:

receiving, through the word box, a user input providing a third keyword; and in response to receiving the user input providing the third keyword, displaying, in the keyword region, the third keyword and an associated third check box that is displayed adjacent to the third keyword.

54. The system of claim 41, the operations comprising:

detecting inputs selecting a new first portion of a new first thumbnail and a new second portion of a new second thumbnail; and determining media item content associated with all thumbnails between the new first portion and the new second portion as a second segment of the media item, wherein the second segment includes media item content corresponding the new first portion of the new first thumbnail and media item content corresponding to the new second portion of the new second thumbnail.

55. The system of claim 54, the operations further comprising;
  displaying, within the user interface, a tools pane that includes a tool configured to enable a user to assign a keyword to one or more segments of the media item;
  detecting input to activate the tool to assign a first keyword to the first segment and the second segment; and
  in response to detecting the input to activate the tool, assigning the first keyword to the first segment and the second segment.

56. The system of claim 55, the operations comprising:
  displaying, within the user interface, a filter tool;
  detecting input to filter the display of the first segment and the second segment based on the assigned first keyword; and
  in response to detecting the input to filter the display:
    removing, from the user interface, thumbnails that are not included in the first segment or the second segment, and
    displaying, in the user interface, the first segment and the second segment.

57. The system of claim 56, wherein detecting input to filter the display comprises:
  detecting input to activate the filter tool; and
  in response to detecting input to activate the filter tool, displaying, in the user interface, a filter palette, the filter palette comprising:
    a plurality of keywords assigned to a plurality of segments of the media item that comprise subsets of the plurality of thumbnails displayed in the media pane; and
    a check box associated with each keyword.

58. The system of claim 57, wherein displaying the filter palette comprises:
  displaying, in association with each keyword included in the filter palette, a time duration for which the associated keyword is assigned to the plurality of segments.

59. The system of claim 57, wherein displaying the filter palette comprises:
  displaying, in the filter palette, a Boolean tool that is selectable by a user, wherein the Boolean tool includes a user-selectable icon indicating Boolean AND, the user-selectable icon is associated with performing Boolean AND operation.

60. The system of claim 57, wherein displaying the filter palette comprises:
  displaying, in the filter palette, a Boolean tool that is selectable by a user, wherein the Boolean tool includes a user-selectable icon indicating Boolean OR, the user-selectable icon is associated with performing Boolean OR operation.

* * * * *